(12) United States Patent
Fan et al.

(10) Patent No.: US 12,368,493 B2
(45) Date of Patent: Jul. 22, 2025

(54) BEAM FAILURE RECOVERY METHOD, DEVICE, AND SYSTEM

(71) Applicant: HUAWEI TECHNOLOGIES CO., LTD., Guangdong (CN)

(72) Inventors: Bo Fan, Chengdu (CN); Peng Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 539 days.

(21) Appl. No.: 17/581,083

(22) Filed: Jan. 21, 2022

(65) Prior Publication Data
US 2022/0141814 A1 May 5, 2022

Related U.S. Application Data

(63) Continuation of application No. PCT/CN2020/099000, filed on Jun. 29, 2020.

(30) Foreign Application Priority Data

Aug. 9, 2019 (CN) .......................... 201910735784.5

(51) Int. Cl.
H04W 72/044 (2023.01)
H04W 24/04 (2009.01)

(52) U.S. Cl.
CPC ......... *H04W 72/046* (2013.01); *H04W 24/04* (2013.01)

(58) Field of Classification Search
CPC .............................. H04W 72/046; H04W 24/04
See application file for complete search history.

(56) References Cited

U.S. PATENT DOCUMENTS

2018/0138962 A1  5/2018 Islam et al.
2018/0302889 A1* 10/2018 Guo ..................... H04B 17/309
(Continued)

FOREIGN PATENT DOCUMENTS

CN    108702767 A   10/2018
CN    109391405 A   2/2019
(Continued)

OTHER PUBLICATIONS

Extended European Search Report issued in European Application No. 20851676.5 on Jul. 13, 2022, 11 pages.
(Continued)

*Primary Examiner* — Jael M Ulysse
(74) *Attorney, Agent, or Firm* — Fish & Richardson P.C.

(57) ABSTRACT

Embodiments of this application provide example beam failure recovery methods, example devices, and example systems to perform beam failure recovery. In one example method, a terminal device receives configuration information. The terminal device can determine M beam failure detection resource groups and N candidate beam resource groups based on the configuration information, where M and N are positive integers greater than 1. In response to determining that quality of each beam failure detection resource in any of the M beam failure detection resource groups is lower than a first threshold, the terminal device can determine, from a candidate beam resource group that is associated with the beam failure detection resource group and that is in the N candidate beam resource groups, one or more candidate beam resources whose quality is higher than a second threshold, and send first indication information.

16 Claims, 6 Drawing Sheets

(56) References Cited

U.S. PATENT DOCUMENTS

| | | | |
|---|---|---|---|
| 2018/0323856 A1* | 11/2018 | Xiong | H04W 74/004 |
| 2018/0368124 A1 | 12/2018 | Liu et al. | |
| 2019/0037423 A1* | 1/2019 | Yu | H04W 74/0833 |
| 2019/0058519 A1* | 2/2019 | Davydov | H04W 72/21 |
| 2019/0082335 A1* | 3/2019 | Yu | H04W 24/04 |
| 2019/0190582 A1* | 6/2019 | Guo | H04L 1/0061 |
| 2019/0200248 A1* | 6/2019 | Basu Mallick | H04W 24/04 |
| 2019/0215048 A1* | 7/2019 | Cirik | H04B 7/088 |
| 2019/0215888 A1* | 7/2019 | Cirik | H04W 72/046 |
| 2019/0253941 A1* | 8/2019 | Cirik | H04W 36/0077 |
| 2019/0253986 A1* | 8/2019 | Jeon | H04L 5/0048 |
| 2019/0261425 A1* | 8/2019 | Park | H04W 76/27 |
| 2019/0297648 A1* | 9/2019 | Nagaraja | H04B 7/063 |
| 2019/0319833 A1* | 10/2019 | Nagaraja | H04L 5/0053 |
| 2019/0349059 A1* | 11/2019 | John Wilson | H04B 7/0695 |
| 2019/0349061 A1* | 11/2019 | Cirik | H04B 7/0617 |
| 2020/0045569 A1* | 2/2020 | Seo | H04W 72/23 |
| 2020/0077283 A1* | 3/2020 | Zhou | H04W 24/04 |
| 2020/0107331 A1* | 4/2020 | Tsai | H04B 7/088 |
| 2020/0136895 A1* | 4/2020 | Venugopal | H04W 74/0833 |
| 2020/0137821 A1* | 4/2020 | Cirik | H04W 72/1268 |
| 2020/0214018 A1* | 7/2020 | Venugopal | H04B 7/088 |
| 2020/0221323 A1* | 7/2020 | Xu | H04L 5/0025 |
| 2021/0044342 A1* | 2/2021 | He | H04L 5/0051 |
| 2021/0409094 A1* | 12/2021 | Yuan | H04W 72/23 |
| 2022/0103225 A1* | 3/2022 | Ling | H04W 76/19 |

FOREIGN PATENT DOCUMENTS

| | | |
|---|---|---|
| CN | 109391988 A | 2/2019 |
| CN | 109842940 A | 6/2019 |
| WO | 2019138070 A1 | 7/2019 |

OTHER PUBLICATIONS

ZTE, "Considerations on beam management for multi-TRP," 3GPP TSG RAN WG1 #97, R1-1906244, Reno, USA, May 13-17, 2019, 7 pages.

3GPP TS 38.321 V15.6.0, "3rd Generation Partnership Project; Technical Specification Group Radio Access Network; NR; Medium Access Control (MAC) protocol specification (Release 15)," Jun. 2019, 78 pages.

3GPP TS 38.211 V15.5.0 (Mar. 2019), "3rd Generation Partnership Project; Technical Specification Group Radio Access Network; NR; Physical channels and modulation (Release 15)," Mar. 2019, 96 pages.

3GPP TS 38.212 V15.5.0 (Mar. 2019), "3rd Generation Partnership Project; Technical Specification Group Radio Access Network; NR; Multiplexing and channel coding (Release 15)," Mar. 2019, 101 pages.

3GPP TS 38.213 V15.5.0 (Mar. 2019), "3rd Generation Partnership Project; Technical Specification Group Radio Access Network; NR; Physical layer procedures for control (Release 15)," Mar. 2019, 104 pages.

3GPP TS 38.214 V15.5.0 (Mar. 2019), "3rd Generation Partnership Project; Technical Specification Group Radio Access Network; NR; Physical layer procedures for data (Release 15)," Mar. 2019, 103 pages.

3GPP TS 38.331 V15.5.0 (Mar. 2019), "3rd Generation Partnership Project; Technical Specification Group Radio Access Network; NR; Radio Resource Control (RRC) protocol specification (Release 15)," Mar. 2019, 491 pages.

Fujitsu, "Discussion on beam failure recovery procedure," 3GPP TSG RAN WG1 Meeting #89, R1-1707255, Hangzhou, P.R. China, May 15-19, 2017, 4 pages.

Office Action issued in Chinese Application No. 20190735784.5 on Sep. 16, 2021, 18 pages (with English translation).

PCT International Search Report and Written Opinion issued in International Application No. PCT/CN2020/099000 on Sep. 16, 2020, 12 pages (partial English translation).

ZTE, "Details of latency and overhead reduction for beam management," 3GPP TSG RAN WG1 #97, R1-1906245, Reno, USA, May 13-17, 2019, 5 pages.

NTT DOCOMO, "List of RAN1 agreements," 3GPP TSG RAN#78, RP-172760, Dec. 21, 2017, 195 pages.

Office Action in Korean Appln. No. 10-2022-7002679, mailed on Jun. 17, 2024, 8 pages (with English translation).

Vivo, "Further discussion on Multi-Beam Operation," 3GPP TSG RAN WG1 #97, R1-1906160, Reno, USA, May 13-17, 2019, 9 pages.

NTT Docomo, Inc., "Discussion on multi-beam enhancement," 3GPP TSG RAN WG1 #97, R1-1906225, Reno, USA, May 13-17, 2019, 24 pages.

Nokia et al., "Enhancements on Multi beam Operation," 3GPP TSG RAN WG1 #97 Meeting, R1-1907317, Reno, Nevada, USA, May 13-17, 2019, 18 pages.

LG Electronics, "Feature lead summary#3 of Enhancements on Multi-beam Operations," 3GPP TSG RAN WG1 Meeting #97, R1-1907860, Reno, USA, May 13-17, 2019, 35 pages.

Notice of Allowance in Korean Appln. No. 10-2022-7002679, mailed on Feb. 3, 2025, 7 pages (with English translation).

* cited by examiner

BEAM FAILURE RECOVERY METHOD, DEVICE, AND SYSTEM

CROSS-REFERENCE TO RELATED APPLICATIONS

This application is a continuation of International Application No. PCT/CN2020/099000, filed on Jun. 29, 2020, which claims priority to Chinese Patent Application No. 201910735784.5, filed on Aug. 9, 2019. The disclosures of the aforementioned applications are hereby incorporated by reference in their entireties.

TECHNICAL FIELD

This application relates to the field of communication technologies, and in particular, to a beam failure recovery method, a device, and a system.

BACKGROUND

A fifth generation (5G) mobile communication system uses high-frequency communication based on an analog beam. The analog beam has relatively narrow signal coverage, and is easily blocked by an obstacle, resulting in a beam failure.

In view of the foregoing problem, a beam failure recovery (BFR) procedure is provided in Release (Rel) 15 of the 5G system. The procedure includes: A network device configures, for a terminal device, a group of beam failure detection resources used for beam failure detection and a group of candidate beam resources used to determine a candidate beam of a current beam. When detecting that quality of each resource in the group of beam failure detection resources is lower than a threshold 1, the terminal device determines that a beam failure occurs. When there is a resource whose quality is higher than a threshold 2 in a corresponding group of candidate beam resources, the terminal device may determine one candidate beam to perform beam failure recovery. The candidate beam is a beam corresponding to a candidate beam resource whose quality is higher than the threshold 2 and that is in the group of candidate beam resources.

However, in some scenarios, a plurality of groups of beam failure detection resources and a plurality of groups of candidate beam resources may need to be configured in one cell for local beam failure detection and recovery. For example, when a cell includes a plurality of transmission reception points (TRP), beam failure detection and recovery need to be performed for each TRP. In such a scenario, if the foregoing method is used to perform beam failure recovery, because the terminal device determines that the beam failure occurs and performs beam failure recovery only when quality of all beam failure detection resources configured by the network device is lower than the threshold 1, the terminal device cannot perform beam failure recovery in time.

SUMMARY

Embodiments of this application provide a beam failure recovery method, a device, and a system, to perform beam failure recovery in time.

To achieve the foregoing objective, the following technical solutions are used in the embodiments of this application.

According to a first aspect, a beam failure recovery method and a corresponding apparatus are provided. In this solution, a terminal device receives configuration information from a network device, and determines M beam failure detection resource groups and N candidate beam resource groups based on the configuration information, where M and N are positive integers, and both M and N are not 1. When quality of each beam failure detection resource in a first beam failure detection resource group is lower than a first threshold, or when average quality of all beam failure detection resources in the first beam failure detection resource group is lower than the first threshold, or when a quantity of beam failure detection resources that are in the first beam failure detection resource group and whose quality is lower than the first threshold is greater than a preset value, the terminal device determines, from the first candidate beam resource group, one or more candidate beam resources whose quality is higher than a second threshold, and sends first indication information to the network device. The first indication information is used to indicate a first candidate beam resource, the first candidate beam resource is a candidate beam resource in the one or more candidate beam resources, the first beam failure detection resource group is any one of the M beam failure detection resource groups, and the first candidate beam resource group is a candidate beam resource group that is associated with the first beam failure detection resource group and that is in the N candidate beam resource groups.

It should be noted that, in this embodiment of this application, that "the terminal device determines, from the first candidate beam resource group, one or more candidate beam resources whose quality is higher than a second threshold" may be understood as that "there are one or more candidate beam resources whose quality is higher than the second threshold in the first candidate beam resource group", and the two expressions are interchangeable.

Based on this solution, in one aspect, when determining that a beam failure occurs in any beam failure detection resource group, the terminal device determines, from a candidate beam resource group associated with the beam failure detection resource group, a candidate beam resource whose quality is higher than the second threshold, and sends the first indication information to the network device to perform beam failure recovery. Therefore, the terminal device does not need to wait until beam failures occur in all the M beam failure detection resource groups of the cell to perform beam failure recovery. In another aspect, because each of the M beam failure detection resource groups is associated with one of the N candidate beam resource groups, recovery may be performed for each group of beam failure detection resources. In conclusion, based on the beam failure recovery method provided in this embodiment of this application, a failed beam can be recovered in time. When the M beam failure detection resource groups use a TRP as a granularity, beam failure recovery at the TRP granularity can be implemented, so that multi-TRP transmission performance is improved.

In a possible design, the configuration information includes M control resource set CORESET groups, and that the terminal device determines M beam failure detection resource groups based on the configuration information includes: If the network device does not configure a beam failure detection resource for the terminal device, the terminal device determines M beam failure detection resource groups based on the M CORESET groups, where each of the M CORESET groups is used to determine one beam failure detection resource group.

In a possible design, that the terminal device sends first indication information to the network device includes: The terminal device sends a first PUCCH to the network device, where the first PUCCH carries or is associated with the first indication information; the terminal device sends a first MAC-CE to the network device, where the first MAC-CE carries or is associated with the first indication information; or the terminal device sends a first PRACH to the network device, where the first PRACH carries or is associated with the first indication information. The first indication information includes one or more of the following: an index of the first candidate beam resource, an index of the first candidate beam resource group, an index of a beam failure recovery configuration corresponding to the first candidate beam resource group, an index of the first beam failure detection resource group, or an index of any beam failure detection resource in the first beam failure detection resource group.

In a possible design, the beam failure recovery method provided in this embodiment of this application further includes: When quality of each beam failure detection resource in the first beam failure detection resource group is lower than the first threshold, if there is no candidate beam resource whose quality is higher than the second threshold in the first candidate beam resource group, the terminal device sends second indication information to the network device. The second indication information includes one or more of the following: an index of the first beam failure detection resource group, an index of any beam failure detection resource in the first beam failure detection resource group, an index of the first candidate beam resource group, an index of a beam failure recovery configuration corresponding to the first candidate beam resource group, information used to indicate that there is no candidate beam resource whose quality is higher than the second threshold, an index of a TRP, an index of a CORESET, an index of a CORESET group, an index of a TAG, an index of a DMRS port, an index of a DMRS port group, an index for CORESET grouping, an index for generating a HARQ codebook, a scrambling index, an index of a PUCCH resource, an index of a PUCCH resource group, an index of an SRS resource group, a slot index, or a sub-slot index.

According to a second aspect, a beam failure recovery method and a corresponding apparatus are provided. In this solution, a network device sends configuration information to a terminal device, where the configuration information is used to determine M beam failure detection resource groups and N candidate beam resource groups, M and N are positive integers, and both M and N are not 1. The network device receives first indication information from the terminal device, where the first indication information is used to indicate a first candidate beam resource, the first candidate beam resource is a candidate beam resource in one or more candidate beam resources whose quality is higher than a second threshold and that are in a first candidate beam resource group, the first candidate beam resource group is a candidate beam resource group that is associated with a first beam failure detection resource group and that is in the N candidate beam resource groups, and the first beam failure detection resource group is any one of the M beam failure detection resource groups. For a technical effect brought by the second aspect, refer to the technical effect brought by the first aspect. Details are not described herein again.

In a possible design, the configuration information includes M control resource set CORESET groups, and each of the M CORESET groups is used to determine one beam failure detection resource group.

In a possible design, that the network device receives first indication information from the terminal device includes: The network device receives a first PUCCH from the terminal device, where the first PUCCH carries or is associated with the first indication information; the network device receives a first MAC-CE from the terminal device, where the first MAC-CE carries or is associated with the first indication information; or the network device receives a first PRACH from the terminal device, where the first PRACH carries or is associated with the first indication information. The first indication information includes one or more of the following: an index of the first candidate beam resource, an index of the first candidate beam resource group, an index of a beam failure recovery configuration corresponding to the first candidate beam resource group, an index of the first beam failure detection resource group, or an index of any beam failure detection resource in the first beam failure detection resource group.

In a possible design, the beam failure recovery method provided in this embodiment of this application further includes: The network device receives second indication information from the terminal device. The second indication information includes one or more of the following: an index of the first beam failure detection resource group, an index of any beam failure detection resource in the first beam failure detection resource group, an index of the first candidate beam resource group, an index of a beam failure recovery configuration corresponding to the first candidate beam resource group, information used to indicate that there is no candidate beam resource whose quality is higher than the second threshold, an index of a TRP, an index of a CORESET, an index of a CORESET group, an index of a TAG, an index of a DMRS port, an index of a DMRS port group, an index for CORESET grouping, an index for generating a HARQ codebook, a scrambling index, an index of a PUCCH resource, an index of a PUCCH resource group, an index of an SRS resource group, a slot index, or a sub-slot index.

With reference to the first aspect or the second aspect, in a possible design, the configuration information includes the M beam failure detection resource groups, and each of the M beam failure detection resource groups includes one or more beam failure detection resources.

With reference to the first aspect or the second aspect, in a possible design, the configuration information includes X beam failure detection resources, each of the X beam failure detection resources is associated with a first index, and X is a positive integer greater than or equal to M. One or more beam failure detection resources associated with a same first index belong to a same beam failure detection resource group, and the first index includes any one of the following: an index of a transmission reception point TRP, an index of a control resource set CORESET, an index of a CORESET group, an index of a timing advance group TAG, an index of a demodulation reference signal DMRS port, an index of a DMRS port group, an index for CORESET grouping, an index for generating a hybrid automatic repeat request HARQ codebook, a scrambling index, an index of a beam failure recovery configuration, an index of a candidate beam resource group, an index of a candidate beam resource, an index of a PUCCH resource, an index of a PUCCH resource group, an index of an SRS resource group, a slot index, or a sub-slot index.

With reference to the first aspect or the second aspect, in a possible design, when the configuration information includes M CORESET groups, that each of the M CORESET groups is used to determine one beam failure detection resource group includes: First reference signal resources in transmission configuration index states (TCI-states) currently activated for all CORESETs in each CORESET group belong to one beam failure detection resource group, where if the TCI-state includes a plurality of reference signal resources, the first reference signal resource is a reference signal resource in quasi co-location information (QCL-Info) that is in the TCI-state and whose type is a type D; or if the TCI-state includes only one reference signal resource, the first reference signal resource is the reference signal resource.

With reference to the first aspect or the second aspect, in a possible design, each of the M CORESET groups is associated with one or more of the N candidate beam resource groups.

With reference to the first aspect or the second aspect, in a possible design, the configuration information includes the N candidate beam resource groups, and each of the N candidate beam resource groups includes one or more candidate beam resources.

With reference to the first aspect or the second aspect, in a possible design, the configuration information includes Y candidate beam resources, each of the Y candidate beam resources is associated with a second index, and Y is a positive integer greater than or equal to N. One or more candidate beam resources associated with a same second index belong to a same candidate beam resource group, and the second index includes any one of the following: an index of a TRP, an index of a CORESET, an index of a CORESET group, an index of a TAG, an index of a DMRS port, an index of a DMRS port group, an index for CORESET grouping, an index for generating a HARQ codebook, a scrambling index, an index of a beam failure recovery configuration, an index of a beam failure detection resource group, an index of a beam failure detection resource, an index of a PUCCH resource, an index of a PUCCH resource group, an index of an SRS resource group, a slot index, or a sub-slot index.

With reference to the first aspect or the second aspect, in a possible design, that the first beam failure detection resource group is associated with the first candidate beam resource group includes: The first beam failure detection resource group and the first candidate beam resource group are associated with a same third index, and the third index includes any one of the following: an index of a TRP, an index of a CORESET, an index of a CORESET group, an index of a TAG, an index of a DMRS port, an index of a DMRS port group, an index for CORESET grouping, an index for generating a HARQ codebook, a scrambling index, an index of a beam failure recovery configuration, an index of a PUCCH resource, an index of a PUCCH resource group, an index of an SRS resource group, a slot index, or a sub-slot index; or that the first beam failure detection resource group is associated with the first candidate beam resource group includes: The first beam failure detection resource group is directly associated with the first candidate beam resource group, where that the first beam failure detection resource group is directly associated with the first candidate beam resource group may include: An index of the first beam failure detection resource group is associated with an index of the first candidate beam resource group; an index of the first beam failure detection resource group is associated with an index of one or more candidate beam resources constituting the first candidate beam resource group; or an index of the first candidate beam resource group is associated with an index of one or more beam failure detection resources constituting the first beam failure detection resource group.

According to a third aspect, a communication apparatus is provided, and is configured to implement the foregoing methods. The communication apparatus may be the terminal device in the first aspect, an apparatus including the terminal device, or an apparatus included in the terminal device, for example, a chip; or the communication apparatus may be the network device in the second aspect, an apparatus including the network device, or an apparatus included in the network device. The communication apparatus includes a corresponding module, unit, or means for implementing the foregoing methods. The module, unit, or means may be implemented by hardware, software, or hardware executing corresponding software. The hardware or software includes one or more modules or units corresponding to the foregoing functions.

According to a fourth aspect, a communication apparatus is provided, including a processor and a memory. The memory is configured to store computer instructions, and when the processor executes the instructions, the communication apparatus is enabled to perform the method according to any one of the foregoing aspects. The communication apparatus may be the terminal device in the first aspect, an apparatus including the terminal device, or an apparatus included in the terminal device, for example, a chip; or the communication apparatus may be the network device in the second aspect, an apparatus including the network device, or an apparatus included in the network device.

According to a fifth aspect, a communication apparatus is provided, including a processor and an interface circuit. The interface circuit may be a code/data read/write interface circuit, and the interface circuit is configured to: receive computer-executable instructions (where the computer-executable instructions are stored in a memory, and may be directly read from the memory, or may pass through another component), and transmit the computer-executable instructions to the processor. The processor is configured to run the computer-executable instructions to perform the method according to any one of the foregoing aspects.

According to a sixth aspect, a communication apparatus is provided, including a processor. The processor is configured to: be coupled to a memory, and perform, after reading instructions in the memory, the method according to any one of the foregoing aspects according to the instructions. The communication apparatus may be the terminal device in the first aspect, an apparatus including the terminal device, or an apparatus included in the terminal device, for example, a chip; or the communication apparatus may be the network device in the second aspect, an apparatus including the network device, or an apparatus included in the network device.

According to a seventh aspect, a computer-readable storage medium is provided. The computer-readable storage medium stores instructions. When the instructions are executed on a communication apparatus, the communication apparatus is enabled to perform the method according to any one of the foregoing aspects. The communication apparatus may be the terminal device in the first aspect, an apparatus including the terminal device, or an apparatus included in the terminal device, for example, a chip; or the communication apparatus may be the network device in the second aspect, an apparatus including the network device, or an apparatus included in the network device.

According to an eighth aspect, a computer program product including instructions is provided. When the computer program product runs on a communication apparatus, the communication apparatus is enabled to perform the method according to any one of the foregoing aspects. The communication apparatus may be the terminal device in the first aspect, an apparatus including the terminal device, or an apparatus included in the terminal device, for example, a chip; or the communication apparatus may be the network device in the second aspect, an apparatus including the network device, or an apparatus included in the network device.

According to a ninth aspect, a communication apparatus (for example, the communication apparatus may be a chip or a chip system) is provided. The communication apparatus includes a processor, and is configured to implement functions in any one of the foregoing aspects. In a possible design, the communication apparatus further includes a memory, and the memory is configured to store necessary program instructions and data. When the communication apparatus is a chip system, the communication apparatus may include a chip, or may include a chip and another discrete component.

For technical effects brought by any one of the designs of the third aspect to the ninth aspect, refer to technical effects brought by different designs of the first aspect or the second aspect. Details are not described herein again.

According to a tenth aspect, a communication system is provided. The communication system includes the terminal device according to the first aspect and the network device according to the second aspect.

DESCRIPTION OF EMBODIMENTS

The following describes technical solutions in embodiments of this application with reference to the accompanying drawings in the embodiments of this application. In descriptions of this application, unless otherwise specified, "/" represents an "or" relationship between associated objects. For example, A/B may represent A or B. In this application, "and/or" describes only an association relationship for describing associated objects and represents that three relationships may exist. For example, A and/or B may represent the following three cases: Only A exists, both A and B exist, and only B exists, where A or B may be singular or plural. In addition, in the descriptions of this application, unless otherwise specified, "at least one" means one or more, and "a plurality of" means two or more. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

Figure 1:
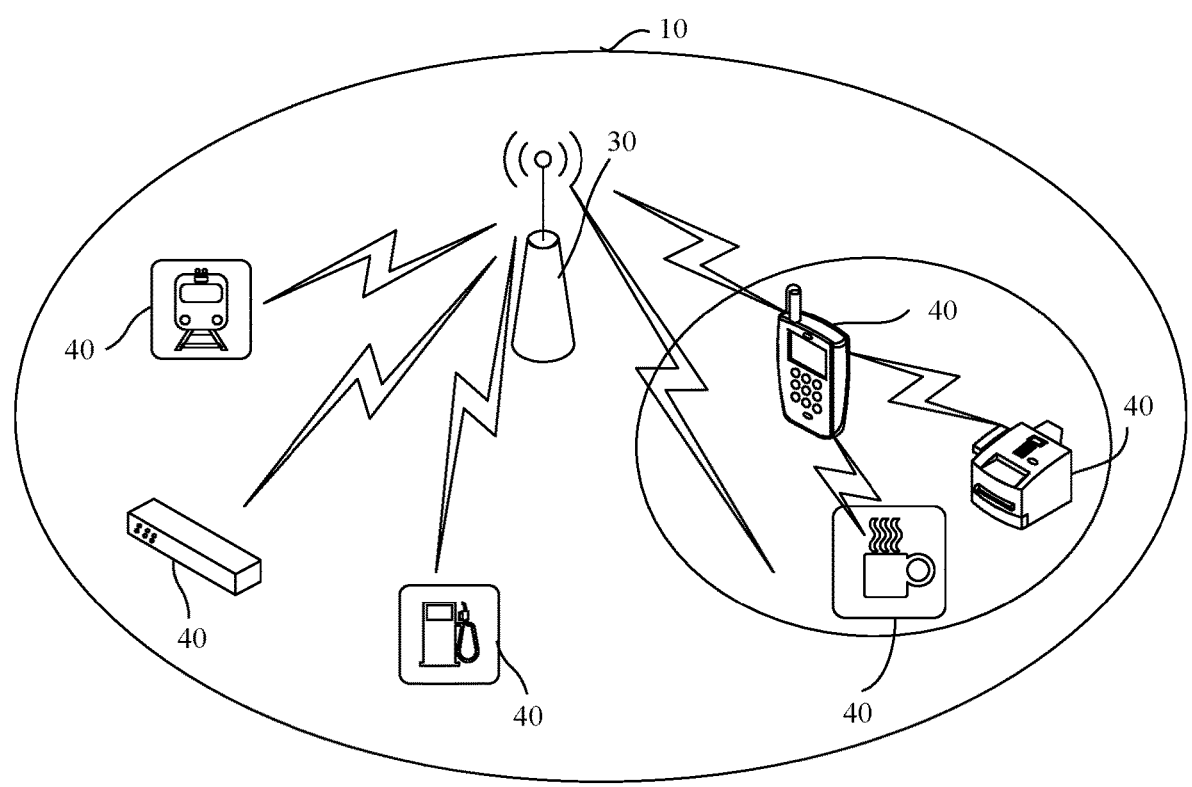
FIG. 1 is a schematic diagram of a structure of a communication system according to an embodiment of this application.

FIG. 1 shows a communication system 10 according to an embodiment of this application. The communication system 10 includes a network device 30 and one or more terminal devices 40 connected to the network device 30. Optionally, different terminal devices 40 may communicate with each other.

For example, as shown in FIG. 1, the network device 30 interacts with any terminal device 40. In this embodiment of this application, in a possible implementation, the network device 30 sends configuration information to the terminal device 40, the terminal device 40 receives the configuration information from the network device 30, and determines M beam failure detection resource groups and N candidate beam resource groups based on the configuration information; and when quality of each beam failure detection resource in a first beam failure detection resource group is lower than a first threshold, the terminal device 40 determines, from a first candidate beam resource group, one or more candidate beam resources whose quality is higher than a second threshold, and sends first indication information to the network device 30. M and N are positive integers, and both M and N are not 1, the first indication information is used to indicate a first candidate beam resource, the first candidate beam resource is the one or more candidate beam resources whose quality is higher than the second threshold, the first beam failure detection resource group is any one of the M beam failure detection resource groups, and the first candidate beam resource group is a candidate beam resource group that is associated with the first beam failure detection resource group and that is in the N candidate beam resource groups.

In this embodiment of this application, the network device configures the M beam failure detection resource groups for one cell. In one aspect, when determining that a beam failure occurs in any beam failure detection resource group, the terminal device determines, from a candidate beam resource group associated with the beam failure detection resource group, a candidate beam resource whose quality is higher than the second threshold, and sends the first indication information to the network device to perform beam failure recovery. Therefore, the terminal device does not need to wait until beam failures occur in all the M beam failure detection resource groups of the cell to perform beam failure recovery. In another aspect, because each of the M beam failure detection resource groups is associated with one of the N candidate beam resource groups, recovery may be performed for each group of beam failure detection resources. In conclusion, based on the beam failure recovery method provided in this embodiment of this application, a failed beam can be recovered in time. When the M beam failure detection resource groups use a TRP as a granularity, beam failure recovery at the granularity of a TRP can be implemented, so that multi-TRP transmission performance is improved.

Figure 2:
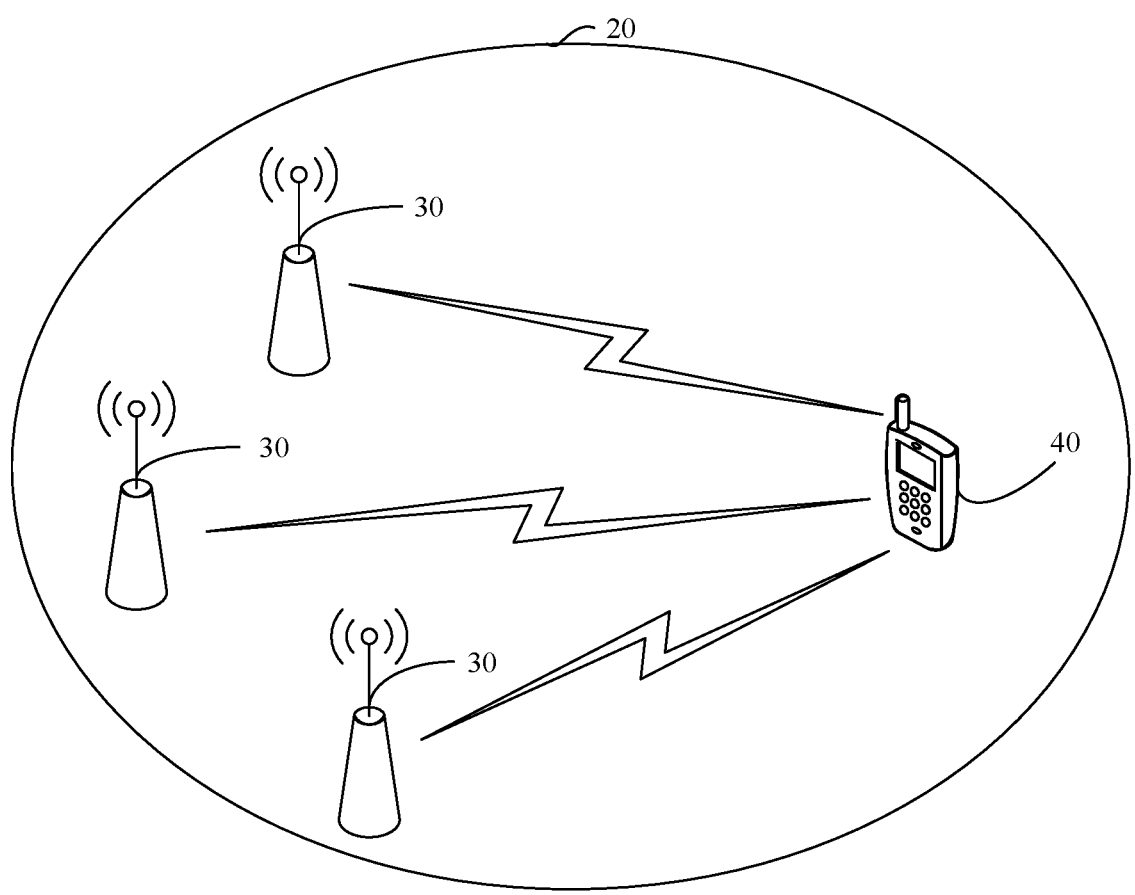
FIG. 2 is a schematic diagram of a structure of another communication system according to an embodiment of this application.

Alternatively, as shown in FIG. 2, an embodiment of this application further provides a communication system 20.

The communication system 20 includes a terminal device 40 and one or more network devices 30 connected to the terminal device 40.

For descriptions of the terminal device 40 interacting with any network device 30 to implement the beam failure recovery method provided in this application shown in FIG. 2, refer to related descriptions of the system shown in FIG. 1. Details are not described herein again.

Optionally, the network device 30 in this embodiment of this application is a device for accessing the terminal device 40 to a wireless network, and may be an evolved NodeB (eNB, or eNodeB) in long term evolution (LTE); or may be a base station in a 5G network or a future evolved public land mobile network (PLMN), a broadband network service gateway (BNG), an aggregation switch, or a non-third generation partnership project (3GPP) access device. Alternatively, the network device 30 in this embodiment of this application may be a radio controller in a cloud radio access network (CRAN); or may be a transmission reception point (TRP), a device including a TRP, or the like. This is not specifically limited in this embodiment of this application. Optionally, the base station in this embodiment of this application may include base stations in various forms, for example, a macro base station, a micro base station (also referred to as a small cell), a relay station, and an access point. This is not specifically limited in this embodiment of this application.

Optionally, the terminal device 40 in this embodiment of this application may be a device such as a terminal or a chip that may be used in a terminal, configured to implement a wireless communication function. The terminal may be user equipment (UE), an access terminal, a terminal unit, a terminal station, a mobile station, a mobile console, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, or another processing device connected to a wireless modem, a vehicle-mounted device, or a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

Optionally, the network device 30 and the terminal device 40 in this embodiment of this application may also be referred to as communication apparatuses, and each may be a general-purpose device or a dedicated device. This is not specifically limited in this embodiment of this application.

Figure 3:
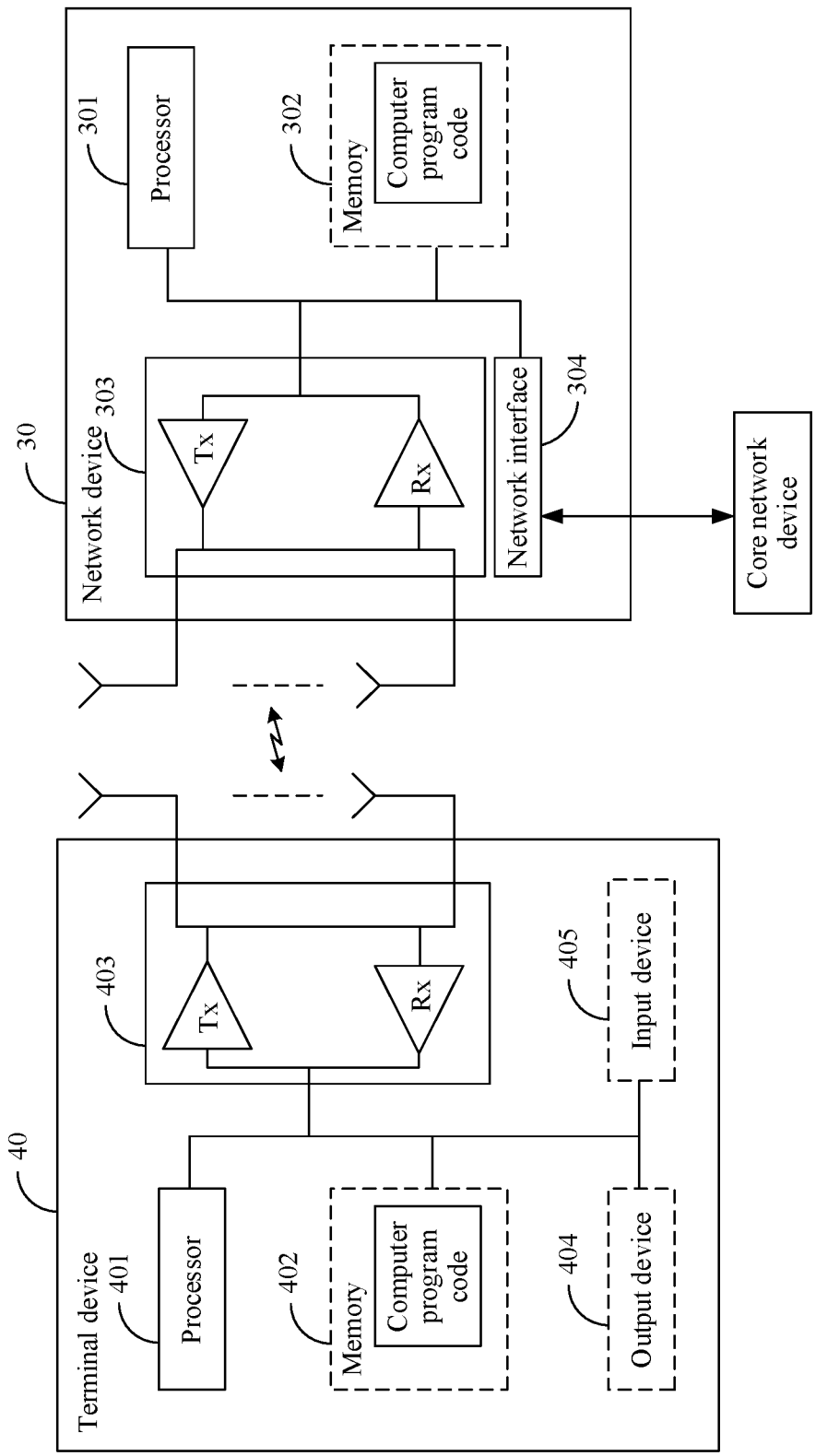
FIG. 3 is a schematic diagram of structures of a terminal device and a network device according to an embodiment of this application.

Optionally, FIG. 3 is a schematic diagram of structures of the network device 30 and the terminal device 40 according to this embodiment of this application.

The terminal device 40 includes at least one processor (an example in which one processor 401 is included is used for description in FIG. 3) and at least one transceiver (an example in which one transceiver 403 is included is used for description in FIG. 3). Optionally, the terminal device 40 may further include at least one memory (an example in which one memory 402 is included is used for description in FIG. 3), at least one output device (an example in which one output device 404 is included is used for description in FIG. 3), and at least one input device (an example in which one input device 405 is included is used for description in FIG. 3).

The processor 401, the memory 402, and the transceiver 403 are connected through a communication line. The communication line may include a path transmitting information between the foregoing components.

The processor 401 may be a general-purpose central processing unit (CPU), a microprocessor, an application-specific integrated circuit (ASIC), or one or more integrated circuits configured to control program execution of the solutions in this application. During specific implementation, in an embodiment, the processor 401 may also include a plurality of CPUs, and the processor 401 may be a single-core (single-CPU) processor or a multi-core (multi-CPU) processor. The processor herein may be one or more devices, circuits, or processing cores configured to process data (for example, computer program instructions).

The memory 402 may be an apparatus having a storage function. For example, the memory 402 may be a read-only memory (ROM) or another type of static storage device capable of storing static information and instructions, or a random access memory (RAM) or another type of dynamic storage device capable of storing information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium capable of carrying or storing expected program code in a form of instructions or a data structure and capable of being accessed by a computer. However, this is not limited thereto. The memory 402 may exist independently, and is connected to the processor 401 through the communication line. Alternatively, the memory 402 may be integrated with the processor 401.

The memory 402 is configured to store computer-executable instructions for performing the solutions in this application, and the processor 401 controls execution of the computer-executable instructions. Specifically, the processor 401 is configured to execute the computer-executable instructions stored in the memory 402, to implement the beam failure recovery method in this embodiment of this application. Optionally, the computer-executable instructions in this embodiment of this application may also be referred to as application program code or computer program code. This is not specifically limited in this embodiment of this application.

The transceiver 403 may use any apparatus such as a transceiver, and is configured to communicate with another device or a communication network such as the Ethernet, a radio access network (RAN), or a wireless local area network (WLAN). The transceiver 403 includes a transmitter (Tx) and a receiver (Rx).

The output device 404 communicates with the processor 401, and may display information in a plurality of manners. For example, the output device 404 may be a liquid crystal display (LCD), a light emitting diode (LED) display device, a cathode ray tube (CRT) display device, a projector, or the like.

The input device 405 communicates with the processor 401, and may receive an input of a user in a plurality of manners. For example, the input device 405 may be a mouse, a keyboard, a touchscreen device, a sensing device, or the like.

The network device 30 includes at least one processor (an example in which one processor 301 is included is used for description in FIG. 3), at least one transceiver (an example in which one transceiver 303 is included is used for description in FIG. 3), and at least one network interface (an example in which one network interface 304 is included is used for description in FIG. 3). Optionally, the network device 30 may further include at least one memory (an example in which one memory 302 is included is used for description in FIG. 3). The processor 301, the memory 302, the transceiver 303, and the network interface 304 are connected through a communication line. The network interface 304 is configured to connect to a core network device through a link (for example, an S1 interface), or connect to a network interface of another network device through a wired or wireless link (for example, an X2 interface) (not shown in FIG. 3). This is not specifically limited in this embodiment of this application. In addition, for descriptions about the processor 301, the memory 302, and the transceiver 303, refer to descriptions about the processor 401, the memory 402, and the transceiver 403 in the terminal device 40. Details are not described again herein.

Figure 4:
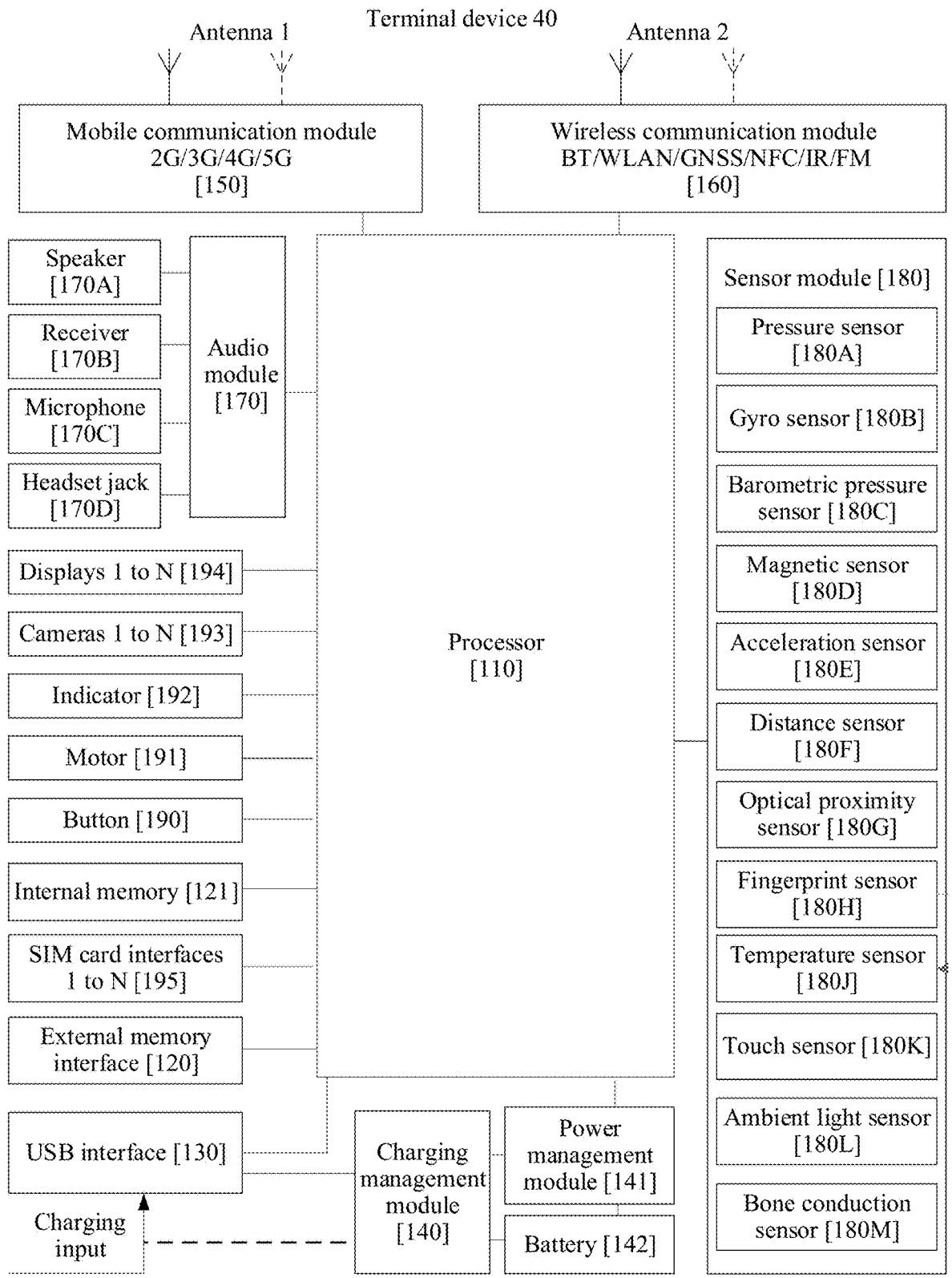
FIG. 4 is a schematic diagram of a structure of another terminal device according to an embodiment of this application.

With reference to the schematic diagram of the structure of the terminal device 40 shown in FIG. 3, for example, FIG. 4 is a specific form of a structure of the terminal device 40 according to an embodiment of this application.

In some embodiments, a function of the processor 401 in FIG. 3 may be implemented by a processor 110 in FIG. 4.

In some embodiments, a function of the transceiver 403 in FIG. 3 may be implemented by using an antenna 1, an antenna 2, a mobile communication module 150, a wireless communication module 160, and the like in FIG. 4.

The antenna 1 and the antenna 2 are configured to transmit and receive electromagnetic wave signals. Each antenna in the terminal device 40 may be configured to cover one or more communication frequency bands. Different antennas may further be shared to improve antenna utilization. For example, the antenna 1 may be shared as a diversity antenna in a wireless local area network. In some other embodiments, the antenna may be used in combination with a tuning switch.

The mobile communication module 150 may provide a solution used for wireless communication including 2G, 3G, 4G, 5G, and the like on the terminal device 40. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to a modem processor for demodulation. The mobile communication module 150 may further amplify a signal modulated by the modem processor, and convert the signal into an electromagnetic wave for radiation through the antenna 1. In some embodiments, at least some function modules in the mobile communication module 150 may be disposed in the processor 110. In some embodiments, at least some function modules in the mobile communication module 150 may be disposed in a same component as at least some modules in the processor 110.

The wireless communication module 160 may provide a solution used for wireless communication including a wireless local area network (WLAN) (for example, a Wi-Fi network), Bluetooth (BT), a global navigational satellite system (GNSS), frequency modulation (FM), near field communication (NFC), an infrared (IR) technology, and the like on the terminal device 40. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave through the antenna 2 for radiation. When the terminal device 40 is a first device, that the wireless communication module 160 may provide a solution used for NFC wireless communication on the terminal device 40 means that the first device includes an NFC chip. The NFC chip can improve an NFC wireless communication function. When the terminal device 40 is a second device, that the wireless communication module 160 may provide a solution used for NFC wireless communication on the terminal device 40 means that the first device includes an electronic label (such as a radio frequency identification (RFID) label). If an NFC chip of another device is close to the electronic label, the another device may perform NFC wireless communication with the second device.

In some embodiments, the antenna 1 of the terminal device 40 is coupled to the mobile communication module 150, and the antenna 2 is coupled to the wireless communication module 160, so that the terminal device 40 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and the like. The GNSS may include a global positioning system (GPS), a global navigation satellite system (GLONASS), a BeiDou navigation satellite system (BDS), a quasi-zenith satellite system (QZSS), or a satellite based augmentation system (SBAS).

In some embodiments, a function of the memory 402 in FIG. 3 may be implemented by using an internal memory 121, an external memory (for example, a micro SD card) connected to an external memory interface 120 in FIG. 4, or the like.

In some embodiments, a function of the output device 404 in FIG. 3 may be implemented by using a display screen 194 in FIG. 4. The display screen 194 is configured to display an image, a video, and the like. The display screen 194 includes a display panel.

In some embodiments, a function of the input device 405 in FIG. 3 may be implemented by using a mouse, a keyboard, a touchscreen device, or a sensor module 180 in FIG. 4. For example, as shown in FIG. 4, the sensor module 180 may include, for example, one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, and a bone conduction sensor 180M. This is not specifically limited in this embodiment of this application.

In some embodiments, as shown in FIG. 4, the terminal device 40 may further include one or more of an audio module 170, a camera 193, an indicator 192, a motor 191, a button 190, a SIM card interface 195, a USB interface 130, a charging management module 140, a power management module 141, and a battery 142. The audio module 170 may be connected to a speaker 170A (which is also referred to as a "horn"), a receiver 170B (which is also referred to as an "earpiece"), a microphone 170C (which is also referred to as a "mike" or a "microphone"), a headset jack 170D, or the like. This is not specifically limited in this embodiment of this application.

It may be understood that the structure shown in FIG. 4 does not constitute a specific limitation on the terminal device 40. For example, in some other embodiments of this application, the terminal device 40 may include more or fewer components than those shown in the figure, or combine some components, or split some components, or have different component arrangements. The components shown in the figure may be implemented by using hardware, software, or a combination of software and hardware.

With reference to FIG. 1 to FIG. 4, the following describes in detail the beam failure recovery method provided in some embodiments of this application by using an example in which the network device 30 interacts with any terminal device 40 shown in FIG. 1.

It should be noted that names of messages between the network elements, names of parameters in the messages, or the like in the following embodiments of this application are merely an example, and there may be other names during specific implementation. This is not specifically limited in the embodiments of this application.

Figure 5:
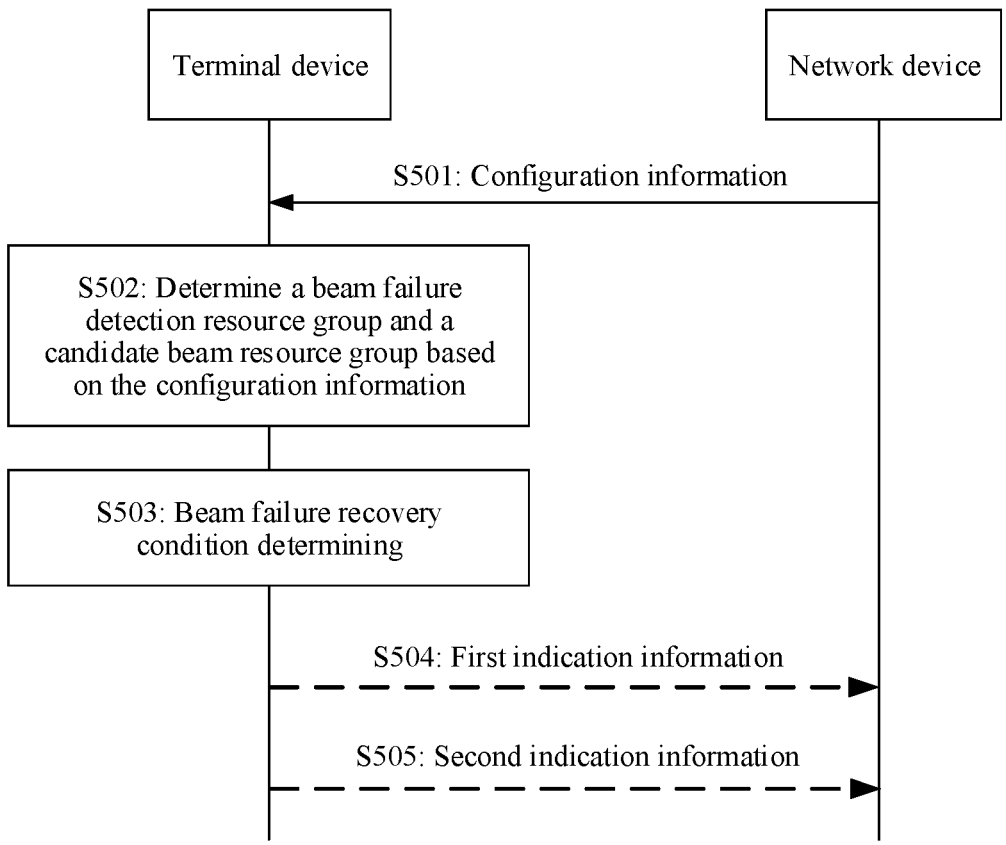
FIG. 5 is a schematic flowchart of a beam failure recovery method according to an embodiment of this application.

FIG. 5 shows a beam failure recovery method according to an embodiment of this application. The beam failure recovery method includes the following steps.

S501: A network device sends configuration information to a terminal device. Correspondingly, the terminal device receives the configuration information from the network device.

The configuration information is used by the network device to indicate a configuration related to beam failure recovery to the terminal device, and mainly includes configurations of a beam failure detection resource and a candidate beam resource. The beam failure detection resource is used for beam failure detection, and the candidate beam resource is used to identify a new available beam.

It should be noted that, in this embodiment of this application, for example, a resource used for beam failure detection is referred to as a beam failure detection resource, and a resource used for identifying a new available beam is referred to as a candidate beam resource. The resource used for beam failure detection and/or the resource used for identifying a new available beam may also have other names during specific implementation. Names of the two types of resources are not specifically limited in this embodiment of this application.

In this embodiment of this application, for a single cell, the network device may configure M beam failure detection resource groups and N candidate beam resource groups for the terminal device by using the configuration information, where the N candidate beam resource groups include a candidate beam resource group associated with each of the M beam failure detection resource groups, and M and N are positive integers.

Optionally, in this embodiment of this application, any one of the M beam failure detection resource groups configured by the network device may be associated with one of the N candidate beam resource groups, that is, an association relationship between the beam failure detection resource group and the candidate beam resource group is a one-to-one relationship; one beam failure detection resource group may be associated with a plurality of candidate beam resource groups, that is, an association relationship between the beam failure detection resource group and the candidate beam resource group is a one-to-many relationship; or a plurality of beam failure detection resource groups may be associated with a same candidate beam resource group, that is, an association relationship between the beam failure detection resource group and the candidate beam resource group is a many-to-one relationship. This is not specifically limited in this embodiment of this application.

It should be noted that, when the association relationship between the beam failure detection resource group and the candidate beam resource group is a one-to-one relationship, both M and N are greater than 1; when the association relationship between the beam failure detection resource group and the candidate beam resource group is a one-to-many relationship or a many-to-one relationship, at least one of M and N is greater than 1. In other words, in this embodiment of this application, both M and N are not 1. For example, both M and N may be positive integers greater than or equal to 2.

S502: The terminal device determines the M beam failure detection resource groups and the N candidate beam resource groups based on the configuration information.

Optionally, after receiving the configuration information, the terminal device determines the M beam failure detection resource groups, the N candidate beam resource groups, and an association relationship between the beam failure detection resource group and the candidate beam resource group based on the configuration information.

S503: The terminal device performs a beam failure recovery condition determining.

Optionally, after determining the M beam failure detection resources, the terminal device measures each of the M beam failure detection resource groups, to further determine whether beam failure recovery needs to be performed.

In the foregoing step S501:

Optionally, in this embodiment of this application, the M beam failure detection resource groups configured by the network device may be grouped at a granularity of a TRP, that is, each beam failure detection resource group corresponds to one TRP. Alternatively, a granularity at another standard may be used. For example, a granularity finer than a TRP is used for grouping, for example, a plurality of beam failure detection resource groups correspond to one TRP. This is not specifically limited in this embodiment of this application.

An example in which the granularity of the beam failure detection resource group is a TRP is used to separately describe a configuration manner of the M beam failure detection resource groups, a configuration manner of the N candidate beam resource groups, and a manner of establishing the association relationship between the beam failure detection resource group and the candidate beam resource group below.

Optionally, in this embodiment of this application, the network device may configure the beam failure detection resource for the terminal device in the following three manners.

Manner 1: The configuration information includes the M beam failure detection resource groups, and each of the M beam failure detection resource groups includes one or more beam failure detection resources.

In Manner 1, for example, each beam failure detection resource group in the configuration information may be configured in the following form:

a beam failure detection resource group (for example, RadioLinkMonitoringRSSet){
 an index of a beam failure detection resource group (for example, RadioLinkMonitoringRSSetID),
 a beam failure detection resource list (for example, RadioLinkMonitoringRSList)
}

The index of the beam failure detection resource group is used to identify the beam failure detection resource group, and the beam failure detection resource list includes one or more beam failure detection resources.

Manner 2: The configuration information includes X beam failure detection resources, each of the X beam failure detection resources is associated with a first index, and X is a positive integer greater than or equal to M.

The X beam failure detection resources are beam failure detection resources constituting the M beam failure detection resource groups. Specifically, in the X beam failure detection resources, one or more beam failure detection resources associated with a same first index belong to a same beam failure detection resource group. In this case, it may be considered that the beam failure detection resource group is associated with the first index.

Optionally, the first index may be any one of the following: an index of a TRP, an index of a control resource set (CORESET), an index of a CORESET group, an index of a timing advance group (TAG), an index of a demodulation reference signal (DMRS) port, an index of a DMRS port group, an index for CORESET grouping, an index for generating a hybrid automatic repeat request (HARQ) codebook, a scrambling index (scrambling ID), an index of a beam failure recovery configuration, an index of a candidate beam resource group, an index of a candidate beam resource, an index of a physical uplink control channel (PUCCH) resource, an index of a PUCCH resource group, an index of a sounding reference signal (SRS) resource group, a slot index, or a sub-slot index. The scrambling index may be a scrambling index of a physical downlink control channel (PDCCH), a physical downlink shared channel (PDSCH), a PUCCH, or a physical uplink shared channel (PUSCH).

The index of the TRP is used to identify one TRP, and in the X beam failure detection resources, one or more beam failure detection resources associated with a same index of a TRP constitute a beam failure detection resource group corresponding to the TRP.

The index of the CORESET, the index of the CORESET group, the index of the TAG, the index of the DMRS port, the index of the DMRS port group, the index for CORESET grouping, the index for generating the HARQ codebook, the index of the PUCCH resource, the index of the PUCCH resource group, the index of the SRS resource group, the slot index, the sub-slot index, and the scrambling index are all associated with the TRP. The network device may configure different indexes for different TRPs. Therefore, the beam failure detection resource group corresponding to each TRP can also be determined by configuring the beam failure detection resource to be associated with the indexes.

For example, the first index is the index of the CORESET group. The network device may configure a CORESET group index 1 for a TRP 1, and configure a CORESET group index 2 for a TRP 2. In this case, in the X beam failure detection resources, one or more beam failure detection resources associated with the CORESET group index 1 constitute a beam failure detection resource group corresponding to the TRP 1, and one or more beam failure detection resources associated with the CORESET group index 2 constitute a beam failure detection resource group corresponding to the TRP 2.

The index of the beam failure recovery configuration is used to identify a beam failure recovery configuration, and the beam failure recovery configuration includes a configuration of one or more candidate beam resource groups in the N candidate beam resource groups. The index of the candidate beam resource group is used to identify one of the N candidate beam resource groups. The index of the candidate beam resource is used to identify a candidate beam resource in the N candidate beam resource groups.

Optionally, in Manner 2, the first index may be used as a parameter of the beam failure detection resource. For example, each beam failure detection resource in the configuration information may be configured in the following form:

a beam failure detection resource (for example, RadioLinkMonitoringRS) {
 an index of a beam failure detection resource (for example, RadioLinkMonitoringRS-Id),
 a first index
}

The foregoing two manners may be considered as manners of directly configuring the M beam failure detection resource groups. Optionally, the M beam failure detection resource groups may also be indirectly configured in the following Manner 3.

Manner 3: The configuration information includes M CORESET groups or K CORESETs constituting the M CORESET groups, where K is a positive integer greater than or equal to M.

Each of the M CORESET groups is used to determine one beam failure detection resource group. Each CORESET group may be associated with a different TRP. It may be understood that a beam failure detection resource group determined based on a CORESET group is a beam failure detection resource group corresponding to a TRP associated with the CORESET group.

Optionally, that each CORESET group is used to determine one beam failure detection resource group includes: First reference signal resources in transmission configuration index states (TCI-state) currently activated for all CORESETs in each CORESET group belong to one beam failure detection resource group. If a TCI-state currently activated for a CORESET includes only one reference signal resource, the first reference signal resource is the reference signal resource. If a TCI-state currently activated for a CORESET includes a plurality of reference signal resources, the first reference signal is a reference signal resource in quasi co-location information (QCL-Info) that is in the TCI-state and whose type is a type D.

For example, an example in which a first CORESET group includes a CORESET #1 and a CORESET #2, and TCI-states currently activated for the CORESET #1 and the CORESET #2 each include only one reference signal resource is used. A beam failure detection resource group determined by the first CORESET group includes a reference signal resource included in the TCI-state currently activated for the CORESET #1 and a reference signal resource included in the TCI-state currently activated for the CORESET #2. The first CORESET group may be any one of the M CORESET groups.

Optionally, when the configuration information includes the M CORESET groups, that each of the M CORESET groups is associated with a different TRP may include: Each CORESET group is associated with a different TRP association index, and the TRP association index may be any one of the following: an index of a TRP, an index of a CORESET, an index of a CORESET group, an index of a TAG, an index of a DMRS port, an index of a DMRS port group, an index for CORESET grouping, an index for generating a HARQ codebook, a scrambling index, an index of a beam failure recovery configuration, an index of a candidate beam resource group, an index of a candidate beam resource, an index of a PUCCH resource, an index of a PUCCH resource group, an index of an SRS resource group, a slot index, or a sub-slot index. For descriptions of the indexes, refer to the descriptions of the indexes in the first index. Details are not described herein again. The network device may configure different TRP association indexes for different CORESET groups. Therefore, beam failure detection resource groups determined by using different CORESET groups correspond to different TRPs.

Optionally, when the configuration information includes K CORESETs constituting the M CORESET groups, each of the K CORESETs may be associated with one TRP association index, and one or more CORESETs associated with a same TRP association index belong to one CORESET group.

Alternatively, optionally, when the configuration information includes K CORESETs constituting the M CORESET groups, each of the K CORESETs may include one CORESET index. One or more CORESETs whose CORESET indexes are odd numbers belong to one CORESET group, and one or more CORESETs whose CORESET indexes are even numbers belong to one CORESET group; CORESETs whose results of CORESET indexes modulo M are the same belong to one CORESET group; or after indexes of the K CORESETs are sorted according to a preset rule, CORESETs corresponding to every K divided by M CORESET indexes belong to one CORESET group, and when K cannot be exactly divided by M, grouping may be performed after a result of dividing K by M is rounded up or rounded down. For example, when K is 5 and M is 2, the five CORESETs need to be grouped into two groups. In this case, if grouping is performed in a manner of rounding-up, three CORESETs corresponding to the first three CORESET indexes obtained through sorting belong to one group, and two CORESETs corresponding to the last two CORESET indexes belong to one group; if grouping is performed in a manner of rounding-down, two CORESETs corresponding to the first two CORESET indexes obtained through sorting belong to one group, and three CORESETs corresponding to the last three CORESET indexes belong to one group.

Optionally, the preset rule may be: sorting the indexes of the K CORESETs in ascending order; sorting the indexes of the K CORESETs in descending order; or sorting the indexes of the K CORESETs according to a sequence in which the network device configures the K CORESETs.

Optionally, because a CORESET whose index is 0 is used to receive downlink control information corresponding to a system information block (SIB) 1, and may be shared by a plurality of TRPs, the K CORESETs may not include the CORESET whose index is 0.

Optionally, in this embodiment of this application, the network device may configure the candidate beam resource for the terminal device in the following two manners.

Manner 1: The configuration information includes the N candidate beam resource groups, and each of the N candidate beam resource groups includes one or more candidate beam resources.

In Manner 1, for example, each candidate beam resource group in the configuration information may be configured in the following form:

a candidate beam resource group (for example, candidateBeamRSSet) {
  an index of a candidate beam resource group (for example, candidateBeamRSSetID),
  a candidate beam resource list (for example, candidateBeamRSlist)
}

The index of the candidate beam resource group is used to identify the candidate beam resource group, and the candidate beam resource list includes one or more candidate beam resources.

Manner 2: The configuration information includes Y candidate beam resources, each of the Y candidate beam resources is associated with a second index, and Y is a positive integer greater than or equal to N.

The Y candidate beam resources are resources constituting the N candidate beam resource groups. Specifically, in the Y candidate beam resources, one or more candidate beam resources associated with a same second index belong to a same candidate beam resource group. In this case, it may be considered that the candidate beam resource group is associated with the second index.

Optionally, the second index may be any one of the following: an index of a TRP, an index of a CORESET, an index of a CORESET group, an index of a TAG, an index of a DMRS port, an index of a DMRS port group, an index for CORESET grouping, an index for generating a HARQ codebook, a scrambling index, an index of a beam failure recovery configuration, an index of a beam failure detection resource group, an index of a beam failure detection resource, an index of a PUCCH resource, an index of a PUCCH resource group, an index of an SRS resource group, a slot index, or a sub-slot index.

For related descriptions of any one of the foregoing indexes, refer to related descriptions of the same index in the configuration manners of the M beam failure detection resource groups. Details are not described herein again.

In a possible implementation, the Y candidate beam resources may be included in a beam failure recovery configuration in the configuration information, and the second index may be used as a parameter of the candidate beam resource. For example, the beam failure recovery configuration may be configured in the following form:

a beam failure recovery configuration (for example, BeamFailureRecoveryConfig) {
  a candidate beam resource list (for example, candidateBeamRSList)
}

The candidate beam resource list includes Y candidate beam resources. For example, the candidate beam resource included in the beam failure recovery configuration may be configured in the following form:

a candidate beam resource (for example, candidateBeamRS) {
  an index of a candidate beam resource (for example, candidateBeamRSID),
  a second index
}

In another possible implementation, the Y candidate beam resources may be included in a plurality of beam failure recovery configurations in the configuration information.

In the foregoing embodiment, configuration manners of the beam failure detection resource group and the candidate beam resource group are described. The following describes configurations of association relationships between the beam failure detection resource group and the candidate beam resource group in the foregoing configuration manners. Optionally, there may be the following cases.

Case 1: The M beam failure detection resource groups are configured in Manner 1, and the N candidate beam resource groups are also configured in Manner 1.

Optionally, in Case 1, the association relationship between the beam failure detection resource group and the candidate beam resource group may be established in the following two manners.

Manner 1: The association relationship between the beam failure detection resource group and the candidate beam resource group is directly configured.

In a possible implementation, the index of the candidate beam resource group may be configured in the beam failure detection resource group. This indicates that the candidate beam resource group is associated with the beam failure detection resource group. For example, each beam failure detection resource group includes an index of a candidate beam resource group. That is, the beam failure detection resource group may be configured in the following form:

```
a beam failure detection resource group (for example,
RadioLinkMonitoringRSSet) {
    an index of a beam failure detection resource group (for example,
RadioLinkMonitoringRSSetID),
    a beam failure detection resource list (for example,
    RadioLinkMonitoringRSList),
    an index of a candidate beam resource group (for example,
    candidateBeamRSSetID)
}
```

In this case, optionally, each beam failure detection resource group may include only an index of one candidate beam resource group, and in this case, a correspondence between the beam failure detection resource group and the candidate beam resource group is a one-to-one correspondence; each beam failure detection resource group may further include indexes of a plurality of candidate beam resource groups, and in this case, a correspondence between the beam failure detection resource group and the candidate beam resource group is a one-to-many correspondence; or indexes of candidate beam resource groups in a plurality of different beam failure detection resource groups may be the same, and in this case, a correspondence between the beam failure detection resource group and the candidate beam resource group is a many-to-one correspondence. This is not specifically limited in this embodiment of this application.

In another possible implementation, the index of the beam failure recovery configuration may be included in the beam failure detection resource group. This indicates that the beam failure detection resource group is associated with the beam failure recovery configuration. Because the candidate beam resource is included in the beam failure recovery configuration, the association between the beam failure detection resource group and the beam failure recovery configuration may also be understood as that the beam failure detection resource group is associated with a candidate beam resource group consisting of candidate beam resources included in the beam failure recovery configuration.

In still another possible implementation, the index of the beam failure detection resource group may be included in the candidate beam resource group. This indicates that the beam failure detection resource group is associated with the candidate beam resource group. Optionally, the candidate beam resource group may include an index of one or more beam failure detection resource groups, or indexes of beam failure detection resource groups included in a plurality of different candidate beam resource groups may be the same.

In yet another possible implementation, the index of the beam failure detection resource group may be included in the beam failure recovery configuration. This indicates that the beam failure detection resource group is associated with the beam failure recovery configuration. Because the candidate beam resource is included in the beam failure recovery configuration, the association between the beam failure detection resource group and the beam failure recovery configuration may also be understood as that the beam failure detection resource group is associated with a candidate beam resource group consisting of candidate beam resources included in the beam failure recovery configuration. Optionally, the beam failure recovery configuration may include an index of one or more beam failure detection resource groups, or indexes of beam failure detection resource groups included in a plurality of different beam failure recovery configurations may be the same.

Manner 2: A third index is configured in each of the beam failure detection resource group and the candidate beam resource group. When third indexes associated with the beam failure detection resource group and the candidate beam resource group are the same, the beam failure detection resource is associated with the candidate beam resource.

Optionally, the third index may be any one of the following: an index of a TRP, an index of a CORESET, an index of a CORESET group, an index of a TAG, an index of a DMRS port, an index of a DMRS port group, an index for CORESET grouping, an index for generating a HARQ codebook, a scrambling index, an index of a beam failure recovery configuration, an index of a PUCCH resource, an index of a PUCCH resource group, an index of an SRS resource group, a slot index, or a sub-slot index.

Optionally, each beam failure detection resource group may include one third index. For example, the beam failure detection resource group may be configured in the following form:

```
a beam failure detection resource group (for example,
RadioLinkMonitoringRSSet) {
    an index of a beam failure detection resource group (for example,
RadioLinkMonitoringRSSetID),
    a beam failure detection resource list (for example,
    RadioLinkMonitoringRSList),
    a third index
}
```

Optionally, each candidate beam resource group may include one third index. For example, the candidate beam resource group may be configured in the following form:

```
a candidate beam resource group (for example, candidateBeamRSSet) {
    an index of a candidate beam resource group (for example,
candidateBeamRSSetID),
    a candidate beam resource list (for example, candidateBeamRSlist),
    a third index
}
```

Case 2: The M beam failure detection resource groups are configured in Manner 1, and the N candidate beam resource groups are configured in Manner 2.

Optionally, in Case 2, the association relationship between the beam failure detection resource group and the candidate beam resource group may be established in the following two manners:

Manner 1: When a second index associated with the candidate beam resource is an index of a beam failure detection resource group, when the N candidate beam resource groups are determined based on the second index, the association relationship between the beam failure detection resource group and the candidate beam resource group has been established, that is, one or more candidate beam resources associated with a same index of a beam failure detection resource group constitute one candidate beam resource group, and a beam failure detection resource group associated with the candidate beam resource group is a beam failure detection resource group corresponding to the second index. In this case, it may also be considered that the beam failure detection resource group is directly associated with the candidate beam resource group.

Manner 2: When a second index associated with the candidate beam resource is an index of a TRP, an index of a TRP may also be configured in the beam failure detection resource group.

In this case, optionally, one or more candidate beam resources associated with a same index of a TRP constitute one candidate beam resource group, and a beam failure detection resource group associated with the candidate beam resource group is a beam failure detection resource group configured with the same index of the TRP. In this case, it may also be considered that both the beam failure detection resource group and the candidate beam resource group are associated with a same third index, and in this case, the third index is an index of a TRP.

Optionally, the same index of the TRP may be configured in different beam failure detection resource groups, to establish a many-to-one association relationship between the beam failure detection resource group and the candidate beam resource group.

It may be understood that, when the second index associated with the candidate beam resource is any one of an index of a CORESET, an index of a CORESET group, an index of a TAG, an index of a DMRS port, an index of a DMRS port group, an index for CORESET grouping, an index for generating a HARQ codebook, a scrambling index, an index of a beam failure recovery configuration, an index of a beam failure detection resource, an index of a PUCCH resource, a slot index, or a sub-slot index, an establishment manner of the association relationship between the beam failure detection resource group and the candidate beam resource group is the same as Manner 2 in Case 2. Details are not described herein again.

Case 3: The M beam failure detection resource groups are configured in Manner 2, and the N candidate beam resource groups are configured in Manner 1.

Optionally, in Case 3, the association relationship between the beam failure detection resource group and the candidate beam resource group may be established in the following two manners:

Manner 1: When a first index associated with the beam failure detection resource is an index of a candidate beam resource group, when the M beam failure detection resource groups are determined based on the first index, the association relationship between the beam failure detection resource group and the candidate beam resource group has been established, that is, one or more beam failure detection resources associated with a same index of a candidate beam resource group constitute one beam failure detection resource group, and a candidate beam resource group associated with the beam failure detection resource group is a candidate beam resource group corresponding to the first index. In this case, it may also be considered that the beam failure detection resource group is directly associated with the candidate beam resource group.

Manner 2: When a first index associated with the beam failure detection resource is an index of a TRP, the index of the TRP may also be configured in the candidate beam resource group.

In this case, optionally, one or more beam failure detection resources associated with a same index of a TRP constitute one beam failure detection resource group, and a candidate beam resource group associated with the beam failure detection resource group is a candidate beam resource group configured with the same index of the TRP. In this case, it may also be considered that both the beam failure detection resource group and the candidate beam resource group are associated with a same third index, and in this case, the third index is the index of the TRP.

Optionally, the same index of the TRP may be configured in different candidate beam resource groups, to establish a one-to-many association relationship between the beam failure detection resource group and the candidate beam resource group.

It may be understood that, when the first index associated with the beam failure detection resource is any one of an index of a CORESET, an index of a CORESET group, an index of a TAG, an index of a DMRS port, an index of a DMRS port group, an index for CORESET grouping, an index for generating a HARQ codebook, a scrambling index, an index of a beam failure recovery configuration, an index of a candidate beam resource, an index of a PUCCH resource, an index of a PUCCH resource group, an index of an SRS resource group, a slot index, or a sub-slot index, an establishment manner of the association relationship between the beam failure detection resource group and the candidate beam resource group is the same as Manner 2 in Case 3. Details are not described herein again.

Case 4: The M beam failure detection resource groups are configured in Manner 2, and the N candidate beam resource groups are configured in Manner 2.

Optionally, in Case 4, one or more beam failure detection resources associated with a same first index constitute one beam failure detection resource group, and one or more candidate beam resources associated with a same second index constitute one candidate beam resource group. When the same first index and the same second index are the same, the beam failure detection resource group is associated with the candidate beam resource group. In this case, it may also be considered that both the beam failure detection resource group and the candidate beam resource group are associated with a same third index, and in this case, the third index is the same as the first index and the second index.

For example, both the first index and the second index are TRP association indexes. In the X beam failure detection resources, if both the beam failure detection resource 1 and the beam failure detection resource 2 are associated with a TRP association index 1, the beam failure detection resource 1 and the beam failure detection resource 2 constitute a beam failure detection resource group 1, and in this case, it may be considered that the beam failure detection resource group 1 is associated with the TRP association index 1. If both the candidate beam resource 1 and the candidate beam resource 2 are associated with the TRP association index 1, the candidate beam resource 1 and the candidate beam resource 2 constitute a candidate beam resource group 1, and in this case, it may be considered that the candidate beam resource group 1 is associated with the TRP association index 1. Because both the beam failure detection resource group 1 and the candidate beam resource group 1 are associated with the TRP association index 1, it may be considered that the beam failure detection resource group 1 is associated with the candidate beam resource group 1.

Case 5: The M beam failure detection resource groups are determined in Manner 3.

Optionally, when the beam failure detection resource groups are indirectly configured by using a CORESET group, each of the M CORESET groups is associated with one or more of the N candidate beam resource groups. That is, the association relationship between the beam failure detection resource group and the candidate beam resource group may be established by establishing an association relationship between the CORESET group and the candidate beam resource group.

Optionally, when the configuration information includes the M CORESET groups, an index of the candidate beam resource group or an index of a beam failure recovery configuration corresponding to the candidate beam resource group, in the N candidate beam resource groups, may be configured in each of the M CORESET groups, to establish an association relationship between the CORESET group and the candidate beam resource. Optionally, the CORESET group may include an index of one or more candidate beam resource groups, or indexes of candidate beam resource groups included in a plurality of different CORESET groups may be the same.

Optionally, when the configuration information includes the M CORESET groups, an index of the CORESET group may be further configured in the candidate beam resource group, to establish the association relationship between the CORESET group and the candidate beam resource. Optionally, the candidate beam resource group may include an index of one or more CORESET groups, or indexes of CORESET groups included in a plurality of different candidate beam resource groups may be the same.

Optionally, when the configuration information includes K CORESETs constituting the M CORESET groups, an index of the candidate beam resource group or an index of a beam failure recovery configuration corresponding to the candidate beam resource group may be configured in each of the K CORESETs, to establish an association relationship between the CORESET group and the candidate beam resource.

In the foregoing step S502:

Optionally, a manner in which the terminal device determines the M beam failure detection resource groups, the N candidate beam resource groups, and an association relationship between the beam failure detection resource group and the candidate beam resource group corresponds to the configuration manner of each resource group and the establishing manner of the association relationship that are in the step S501.

In the foregoing step S503:

The beam failure recovery condition determining is described in detail by using an example in which the terminal device measures the first beam failure detection resource group. The first beam failure detection resource group is any one of the M beam failure detection resource groups, a candidate beam resource group that is associated with the first beam failure detection resource group and that is in the N candidate beam resource groups is a first candidate beam resource group, and the first candidate beam resource group may include one or more candidate beam resource groups.

It can be learned from the configuration manner of the association relationship between the beam failure detection resource group and the candidate beam resource group provided in step S501 that, the association between the first beam failure detection resource group and the first candidate beam resource group may include: both the first beam failure detection resource group and the first candidate beam resource group are associated with a same third index; or the first beam failure detection resource group is directly associated with the first candidate beam resource group. For related descriptions, refer to the foregoing step S501. Details are not described herein again.

Optionally, the terminal device may measure each beam failure detection resource in the first beam failure detection resource group, and when quality of each beam failure detection resource is lower than a first threshold, the terminal device determines that a beam failure occurs; when average quality of all beam failure detection resources in the first beam failure detection resource group is lower than a first threshold, the terminal device determines that a beam failure occurs; or when a quantity of beam failure detection resources that are in the first beam failure detection resource group and whose quality is lower than a first threshold is greater than a preset value, the terminal device determines that a beam failure occurs.

After the terminal device determines that the beam failure occurs, a first protocol layer entity of the terminal device reports beam failure indication information to a second protocol layer entity of the terminal device, and the beam failure indication information may include one or more of the following: an index of the first beam failure detection resource group, a first index associated with the first beam failure detection resource group, an index of the first candidate beam resource group, or an index of a beam failure recovery configuration corresponding to the first candidate beam resource group.

Optionally, after receiving the beam failure indication information from the first protocol layer entity, the second protocol layer entity of the terminal device sends a request message to the first protocol layer entity. The request message is used to request the first protocol layer entity to report information about a candidate beam corresponding to the first beam failure detection resource group. The information about the candidate beam may be information about one or more candidate beam resources that are in the first candidate beam resource group and whose quality is higher than a second threshold, and the request message may include one or more of the following: an index of the first beam failure detection resource group, a first index associated with the first beam failure detection resource group, an index of the first candidate beam resource group, or an index of a beam failure recovery configuration corresponding to the first candidate beam resource group.

Optionally, the first protocol layer entity of the terminal device may determine, from the first candidate beam resource group, one or more candidate beam resources whose quality is higher than a second threshold, and report candidate beam indication information to the second protocol layer entity, where the candidate beam indication information may include one or more of the following: an index of the one or more candidate beam resources whose quality is higher than the second threshold, an index of the first candidate beam resource group, an index of a beam failure recovery configuration corresponding to the first candidate beam resource group, a second index associated with the first candidate beam resource, an index of the first beam failure detection resource group, or an index of any beam failure detection resource in the first beam failure detection resource group.

For example, when the candidate beam indication information includes the index of the one or more candidate beam resources whose quality is higher than the second threshold, the second protocol layer entity may directly determine the candidate beam based on the candidate beam indication information.

Alternatively, optionally, when determining that there is no candidate beam resource whose quality is higher than the second threshold in the first candidate beam resource group, the first protocol layer entity of the terminal device may report, to the second protocol layer entity, information used to indicate that there is no candidate beam resource whose quality is higher than the second threshold in the first candidate beam resource group.

Optionally, in the foregoing step S503, when the second protocol layer entity receives the candidate beam indication information from the first protocol layer entity, the following step S504 is performed to initiate beam failure recovery; or in the foregoing step S503, when the second protocol layer entity receives, from the first protocol layer entity, the information that is used to indicate that there is no candidate beam resource whose quality is higher than the second threshold in the first candidate beam resource group, the following step S505 is performed.

Optionally, the first protocol layer entity may be, for example, a physical (PHY) layer entity, and the second protocol layer entity may be, for example, a medium access control (MAC) layer entity.

S504: The terminal device sends first indication information to the network device. Correspondingly, the network device receives the first indication information from the terminal device.

The first indication information is used to indicate a first candidate beam resource to the network device, so that the network device determines a candidate beam based on the first candidate beam resource, where the first candidate beam resource is a candidate beam resource in one or more candidate beam resources whose quality is higher than the second threshold and that are in the first candidate beam resource group determined by the terminal device in the step S503. That is, the terminal device may indicate, to the network device, all candidate beam resources that are in the first candidate beam resource group and whose quality is higher than the second threshold, or may indicate, to the network device, a part of candidate beam resources or one candidate beam resource that are/is in the first candidate beam resource group and whose quality is higher than the second threshold, where the part of candidate beam resources or the one candidate beam resource may be, for example, candidate beam resources or a candidate beam resource with highest quality in the first candidate beam resource group.

Optionally, the first indication information may include one or more of the following: an index of the first candidate beam resource, an index of the first candidate beam resource group, an index of a beam failure recovery configuration corresponding to the first candidate beam resource group, a second index associated with the first candidate beam resource, an index of the first beam failure detection resource group, or an index of any beam failure detection resource in the first beam failure detection resource group.

Optionally, the terminal device may send the first indication information to the network device in the following three manners.

Manner 1: The terminal device sends the first indication information to the network device by using a PUCCH.

In a possible implementation, the terminal device may send a first PUCCH to the network device, and carry the first indication information on the first PUCCH. After receiving the first PUCCH, the network device may determine, based on the first indication information carried on the first PUCCH, a candidate beam identified by the terminal device and a TRP association index associated with the first beam failure detection resource group in which a beam failure occurs, and send a response message to the terminal device by using the candidate beam, where the response message is carried in downlink control information (DCI). The terminal device may monitor the DCI in a dedicated search space (for example: a recovery search space) of a BFR response message, and if the terminal device successfully receives the DCI, the beam failure recovery successes. For descriptions of the TRP association index, refer to related descriptions in the configuration manner 3 of the M beam failure detection resource groups in the foregoing step S501. Details are not described herein again.

It should be noted that, in this embodiment of this application, both "a beam failure detection resource group in which a beam failure occurs" and "a beam failure occurs in a beam failure detection resource group" may be understood as "a beam failure occurs in a beam corresponding to a beam failure detection resource group". This is described herein in a unified manner. Details are not described again in the following embodiments.

For example, when the first indication information is an index of the first candidate beam resource, the network device may determine, based on the index of the first candidate beam resource, a candidate beam corresponding to the first candidate beam resource, and the candidate beam is the candidate beam identified by the terminal device. In addition, the network device may determine the first candidate beam resource group based on the index of the first candidate beam resource, then determine, by using the association relationship between the candidate beam resource group and the beam failure detection resource group, the first beam failure detection resource group in which a beam failure occurs, and finally determine, by using an association relationship between the beam failure detection resource group and the TRP association index, the TRP association index associated with the first beam failure detection resource group in which the beam failure occurs.

In another possible implementation, the terminal device may not directly carry the first indication information on the first PUCCH, but indirectly send the first indication information by using an association relationship between the first PUCCH and the first indication information. For example, the network device may configure a plurality of PUCCHs for the terminal device, and each PUCCH is associated with one or more of the following: an index of a candidate beam resource, an index of a candidate beam resource group, an index of a beam failure recovery configuration, an index of a beam failure detection resource group, or an index of a beam failure detection resource. After determining the first indication information, the terminal device may determine the first PUCCH based on an association relationship between the first indication information and the first PUCCH, and finally send the first PUCCH to the network device. After receiving the first PUCCH, the network device may determine the first indication information based on the association relationship between the first PUCCH and the first indication information, to send a response message to the terminal device based on the first indication information by using the candidate beam.

In another possible implementation, the terminal device may further indirectly send the first indication information by using an association relationship between the first PUCCH and a first TRP association index, and an association relationship between the first TRP association index and the first indication information, where the first TRP association index is associated with the first beam failure detection resource group in which the beam failure occurs. For example, the network device may configure the first PUCCH to be associated with the first TRP association index, and configure the first TRP association index to be associated with the first indication information. After determining the first indication information, the terminal device may determine the first TRP association index based on the association relationship between the first TRP association index and the first indication information, then determine the first PUCCH based on the association relationship between the first TRP association index and the first PUCCH, and finally send the first PUCCH to the network device. After receiving the first PUCCH, the network device may determine the first indication information based on the association relationship between the first PUCCH and the first TRP association index and the association relationship between the first TRP association index and the first indication information, to send the response message to the terminal device based on the first indication information by using the candidate beam.

In another possible manner, the terminal device may send the first PUCCH to the network device, and carry the first indication information on the first PUCCH, and indicate, by using the association relationship between the first PUCCH and the first TRP association index, the first TRP association index associated with the first beam failure detection resource group in which the beam failure occurs. After receiving the first PUCCH, the network device may determine, based on the first indication information, the candidate beam identified by the terminal device, and may further determine, based on the association relationship between the first PUCCH and the first TRP association index, that the beam failure occurs in the first beam failure detection resource group associated with the first TRP association index.

For example, the TRP association index is an index of a CORESET group, two CORESET groups are configured in one cell, an index of a first CORESET group is associated with the first PUCCH, and an index of a second CORESET group is associated with a second PUCCH. When determining that the beam failure occurs in the first beam failure detection resource group associated with the first CORESET group, the terminal device may send the first PUCCH to the network device, and carry the first indication information on the first PUCCH. After receiving the first PUCCH, the network device may determine that the beam failure occurs in the first beam failure detection resource group associated with the first CORESET group associated with the first PUCCH, and send the response message to the terminal device based on the first indication information by using the candidate beam.

In another possible implementation, when there is an association relationship between the PUCCH and the TRP association index, the terminal device may indicate, to the network device by using a PUCCH associated with a TRP association index associated with a beam failure detection resource group in which no beam failure occurs, the first TRP association index associated with the first beam failure detection resource group in which a beam failure occurs, and carry the first indication information on the PUCCH.

For example, the TRP association index is an index of a CORESET group, two CORESET groups are configured in one cell, an index of a first CORESET group is associated with the first PUCCH, and an index of a second CORESET group is associated with a second PUCCH. When determining that the beam failure occurs in the first beam failure detection resource group associated with the first CORESET group, the terminal device may send the second PUCCH to the network device. After receiving the second PUCCH, the network device may determine that the beam failure occurs in the first beam failure detection resource group associated with the first CORESET group associated with the first PUCCH, and send the response message to the terminal device based on the first indication information by using the candidate beam.

Manner 2: The terminal device sends the first indication information to the network device by using a medium access control-control element (MAC-CE).

Optionally, the terminal device may send a first MAC-CE to the network device, and carry the first indication information in the first MAC-CE; the terminal device may not directly carry the first indication information in the first MAC-CE, but indirectly send the first indication information by using an association relationship between the first MAC-CE and the first indication information; the terminal device may further indirectly send the first indication information by using an association relationship between the first MAC-CE and a first TRP association index, and an association relationship between the first TRP association index and the first indication information; the terminal device may further carry the first indication information in the first MAC-CE, and indicate, by using an association relationship between the first MAC-CE and the first TRP association index, the first TRP association index associated with the first beam failure detection resource group in which a beam failure occurs; or the terminal device may further indicate, to the network device by using a MAC-CE associated with a TRP association index associated with a beam failure detection resource group in which no beam failure occurs, a first TRP association index associated with the first beam failure detection resource group in which a beam failure occurs, and carry the first indication information in the MAC-CE. For related descriptions and actions of the network device, refer to related descriptions in Manner 1. Details are not described herein again.

Manner 3: The terminal device sends the first indication information to the network device by using a physical random access channel (PRACH).

Optionally, the terminal device may send a first PRACH to the network device, and carry the first indication information on the first PRACH; the terminal device may not directly carry the first indication information on the first PRACH, but indirectly send the first indication information by using an association relationship between the first PRACH and the first indication information; the terminal device may further indirectly send the first indication information by using an association relationship between the first PRACH and a first TRP association index, and an association relationship between the first TRP association index and the first indication information; the terminal device may further carry the first indication information on the first PRACH, and indicate, by using an association relationship between the first PRACH and the first TRP association index, the first TRP association index associated with the first beam failure detection resource group in which a beam failure occurs; or the terminal device may further indicate, to the network device by using a PRACH associated with a TRP association index associated with a beam failure detection resource group in which no beam failure occurs, a first TRP association index associated with the first beam failure detection resource group in which a beam failure occurs, and carry the first indication information on the PRACH. For related descriptions and actions of the network device, refer to related descriptions in Manner 1. Details are not described herein again.

It should be noted that, the association relationships between the first PUCCH and the first indication information, between the first MAC-CE and the first indication information, and between the first PRACH and the first indication information that are in the step S504 may be configured by the network device, or may be predefined in a protocol. This is not specifically limited in this embodiment of this application.

It should be noted that, it is not limited in this embodiment of this application that the terminal device sends the first indication information to the network device in only one of the foregoing manners. Optionally, the terminal device may send the first indication information in a combination of the foregoing plurality of manners. For example, when the terminal device sends the first indication information in Manner 3, if beam failure recovery does not succeed, for example, the terminal device does not receive the response message from the network device within a specific period of time, or the terminal device does not receive the response message when a PRACH message 1 is retransmitted for a maximum quantity of times, the terminal device may continue to send the first indication information to the network device in Manner 1 or Manner 2.

S505: The terminal device sends second indication information to the network device. Correspondingly, the network device receives the second indication information from the terminal device.

Optionally, when the terminal device determines that quality of each beam failure detection resource in the first beam failure detection resource group is lower than a first threshold, or that average quality of all beam failure detection resources in the first beam failure detection resource group is lower than the first threshold, or that a quantity of beam failure detection resources that are in the first beam failure detection resource group and whose quality is lower than the first threshold is greater than a preset value, and there is no candidate beam resource whose quality is higher than a second threshold in the first candidate beam resource group, the terminal device sends the second indication information to the network device.

Optionally, the second indication information includes one or more of the following: an index of the first beam failure detection resource group, an index of any beam failure detection resource in the first beam failure detection resource group, an index of the first candidate beam resource group, an index of a beam failure recovery configuration corresponding to the first candidate beam resource group, information used to indicate that there is no candidate beam resource whose quality is higher than the second threshold, an index of a TRP, an index of a CORESET, an index of a CORESET group, an index of a TAG, an index of a DMRS port, an index of a DMRS port group, an index for CORESET grouping, an index for generating a HARQ codebook, a scrambling index, an index of a PUCCH resource, an index of a PUCCH resource group, an index of an SRS resource group, a slot index, or a sub-slot index.

Optionally, the terminal device may send the second indication information to the network device in the following three manners.

Manner 1: The terminal device sends the second indication information to the network device by using a PUCCH.

In a possible implementation, the terminal device may send a third PUCCH to the network device, and carry the second indication information on the third PUCCH. After receiving the third PUCCH, the network device may determine a first beam failure detection resource group in which a beam failure occurs and a TRP association index associated with the first beam failure detection resource group. For example, when the second indication information includes an index of the first beam failure detection resource group, the network device may determine, based on the second indication information, that a beam failure occurs in the first beam failure detection resource group, and determine, based on an association relationship between the beam failure detection resource group and the TRP association index, a first TRP association index associated with the first beam failure detection resource group.

In another possible implementation, the terminal device may not directly carry the second indication information on the third PUCCH, but indirectly send the second indication information by using an association relationship between the third PUCCH and the second indication information. For example, the network device may configure the third PUCCH to be associated with the second indication information. After determining the second indication information, the terminal device may determine the third PUCCH based on the association relationship between the second indication information and the third PUCCH, and finally send the third PUCCH to the network device. After receiving the third PUCCH, the network device may determine the second indication information based on the association relationship between the third PUCCH and the second indication information, to determine a first beam failure detection resource group in which a beam failure occurs and a TRP association index associated with the first beam failure detection resource group.

In another possible implementation, the terminal device may further indirectly send the second indication information by using an association relationship between the third PUCCH and a first TRP association index, and an association relationship between the first TRP association index and the second indication information. For example, the network device may configure the third PUCCH to be associated with the first TRP association index, and configure the first TRP association index to be associated with the second indication information. After determining the second indication information, the terminal device may determine the first TRP association index based on the association relationship between the first TRP association index and the second indication information, then determine the third PUCCH based on the association relationship between the first TRP association index and the third PUCCH, and finally send the third PUCCH to the network device. After receiving the third PUCCH, the network device may determine the first TRP association index based on the association relationship between the third PUCCH and the first TRP association index, and determine the second indication information based on the association relationship between the first TRP association index and the second indication information, to determine, based on the second indication information, that a beam failure occurs in the first beam failure detection resource group.

In another possible implementation, when there is an association relationship between the PUCCH and the TRP association index, the terminal device may indicate, by using a PUCCH associated with a TRP association index associated with a beam failure detection resource group in which no beam failure occurs, the first TRP association index associated with the first beam failure detection resource group in which a beam failure occurs, and carry the second indication information on the PUCCH.

For example, the TRP association index is an index of a CORESET group, two CORESET groups are configured in one cell, an index of a third CORESET group is associated with the third PUCCH, and an index of a fourth CORESET group is associated with a fourth PUCCH. When determining that a beam failure occurs in a third beam failure detection resource group associated with the third CORESET group, the terminal device may send the fourth PUCCH to the network device. After receiving the fourth PUCCH, the network device may determine the first TRP association index associated with the third PUCCH, and determines, based on the second indication information, that a beam failure occurs in the first beam failure detection resource group.

Manner 2: The terminal device sends the second indication information to the network device by using a MAC-CE.

Optionally, the terminal device may send a second MAC-CE to the network device, and carry the second indication information in the second MAC-CE; the terminal device may not directly carry the second indication information in the second MAC-CE, but indirectly send the second indication information by using an association relationship between the second MAC-CE and the second indication information; the terminal device may further indirectly send the second indication information by using an association relationship between the second MAC-CE and a first TRP association index, and an association relationship between the first TRP association index and the second indication information; or the terminal device may further indicate, to the network device by using a MAC-CE associated with a TRP association index associated with a beam failure detection resource group in which no beam failure occurs, a first TRP association index associated with the first beam failure detection resource group in which a beam failure occurs, and carry the second indication information in the MAC-CE. For related descriptions and actions of the network device, refer to related descriptions in Manner 1. Details are not described herein again.

Manner 3: The terminal device sends the second indication information to the network device by using a PRACH.

Optionally, the terminal device may send a second PRACH to the network device, and carry the second indication information on the second PRACH; the terminal device may not directly carry the second indication information on the second PRACH, but indirectly send the second indication information by using an association relationship between the second PRACH and the second indication information; the terminal device may further indirectly send the second indication information by using an association relationship between the second PRACH and a first TRP association index, and an association relationship between the first TRP association index and the second indication information; or the terminal device may further indicate, to the network device by using a PRACH associated with a TRP association index associated with a beam failure detection resource group in which no beam failure occurs, a first TRP association index associated with the first beam failure detection resource group in which a beam failure occurs, and carry the second indication information on the PRACH. For related descriptions and actions of the network device, refer to related descriptions in Manner 1. Details are not described herein again.

Optionally, after determining the first TRP association index, the network device may adjust, by using radio resource control (RRC) signaling, MAC-CE signaling, or DCI signaling, a related parameter of a TRP corresponding to the first TRP association index.

Optionally, the related parameter of the TRP may include one or more of the following: a report configuration (reportConfig), a resource, a resource set, a resource setting, a trigger state, a TCI state, a sounding reference signal (SRS) resource (SRS resource), an SRS resource set, a spatial relationship (spatialRelation), a timing advance (TA), a TAG, a PRACH-related resource, a scheduling request (SR), a PUCCH resource, an uplink configuration grant (configured UL grant), a semi-persistent PUSCH resource, a HARQ process, and a power control-related parameter.

Optionally, adjustment of the related parameter corresponding to the TRP by the network device may include reconfiguration, release, activation, deactivation, clearing, or the like on the related parameter.

In this embodiment of this application, the network device configures the M beam failure detection resource groups for one cell. In one aspect, when determining that a beam failure occurs in any beam failure detection resource group, the terminal device determines, from a candidate beam resource group associated with the beam failure detection resource group, a candidate beam resource whose quality is higher than the second threshold, and sends the first indication information to the network device to perform beam failure recovery. Therefore, the terminal device does not need to wait until beam failures occur in all the M beam failure detection resource groups of the cell to perform beam failure recovery. In another aspect, because each of the M beam failure detection resource groups is associated with one of the N candidate beam resource groups, recovery may be performed for each group of beam failure detection resources. In conclusion, based on the beam failure recovery method provided in this embodiment of this application, a failed beam can be recovered in time. When the M beam failure detection resource groups use a TRP as a granularity, beam failure recovery at the granularity of a TRP can be implemented, so that multi-TRP transmission performance is improved.

The processor 301 in the network device 30 shown in FIG. 3 may invoke application program code stored in the memory 302, to instruct the network device to perform the actions of the network device in steps S501 to S504 or S501 to S505. The processor 401 in the terminal device 40 shown in FIG. 3 may invoke application program code stored in the memory 402, to instruct the network device to perform the actions of the terminal device in steps S501 to S504 or S501 to S505. This is not limited in this embodiment.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component that can be used in the network device.

The foregoing mainly describes the solutions provided in the embodiments of this application from a perspective of interaction between network elements. Correspondingly, an embodiment of this application further provides a communication apparatus, and the communication apparatus is configured to implement the foregoing methods. The communication apparatus may be the terminal device in the foregoing method embodiments, or an apparatus including the foregoing terminal device, or a component that can be used in the terminal device. Alternatively, the communication apparatus may be the network device in the foregoing method embodiments, or an apparatus including the foregoing network device, or a component that can be used in the network device. It may be understood that, to implement the foregoing functions, the communication apparatus includes corresponding hardware structures and/or software modules for performing the functions. A person skilled in the art should be easily aware that units and algorithm steps in the examples described with reference to the embodiments disclosed in this specification can be implemented in a form of hardware or a combination of hardware and computer software in this application. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, the communication apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software functional module. It should be noted that, in this embodiment of this application, division into the modules is an example, and is merely a logical function division. In actual implementation, another division manner may be used.

Figure 6:
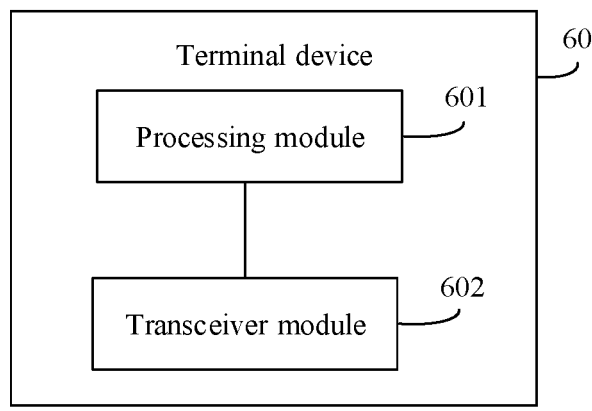
FIG. 6 is a schematic diagram of another structure of a terminal device according to an embodiment of this application.

For example, the communication apparatus is the terminal device in the foregoing method embodiments. FIG. 6 is a schematic diagram of a structure of a terminal device 60. The terminal device 60 includes a processing module 601 and a transceiver module 602. The transceiver module 602 may also be referred to as a transceiver unit, configured to implement a sending and/or receiving function. For example, the transceiver module 602 may be a transceiver circuit, a transceiver machine, a transceiver, or a communication interface.

The transceiver module 602 may include a receiving module and a sending module, which are respectively configured to perform receiving and sending steps performed by the terminal device in the foregoing method embodiments. The processing module 601 may be configured to perform steps other than the receiving and sending steps performed by the terminal device in the foregoing method embodiments.

For example, the transceiver module 602 is configured to receive configuration information from the network device; and the processing module 601 is configured to determine M beam failure detection resource groups and N candidate beam resource groups based on the configuration information, where M and N are positive integers, and both M and N are not 1. When quality of each beam failure detection resource in a first beam failure detection resource group is lower than a first threshold, or when average quality of all beam failure detection resources in the first beam failure detection resource group is lower than the first threshold, or when a quantity of beam failure detection resources that are in the first beam failure detection resource group and whose quality is lower than the first threshold is greater than a preset value, the processing module 601 is further configured to determine, from the first candidate beam resource group, one or more candidate beam resources whose quality is higher than a second threshold, and the transceiver module 602 is further configured to send first indication information to the network device. The first indication information is used to indicate a first candidate beam resource, the first candidate beam resource is a candidate beam resource in the one or more candidate beam resources, the first beam failure detection resource group is any one of the M beam failure detection resource groups, and the first candidate beam resource group is a candidate beam resource group that is associated with the first beam failure detection resource group and that is in the N candidate beam resource groups.

Optionally, that the processing module 601 is configured to determine M beam failure detection resource groups based on the configuration information includes: If the network device does not configure a beam failure detection resource for the terminal device, the processing module 601 is configured to determine M beam failure detection resource groups based on the M CORESET groups, where each of the M CORESET groups is used to determine one beam failure detection resource group.

Optionally, that the transceiver module 602 is further configured to send first indication information to the network device includes: The transceiver module 602 is further configured to send a first PUCCH to the network device, where the first PUCCH carries or is associated with the first indication information; the transceiver module 602 is further configured to send a first MAC-CE to the network device, where the first MAC-CE carries or is associated with the first indication information; or the transceiver module 602 is further configured to send a first PRACH to the network device, where the first PRACH carries or is associated with the first indication information.

Optionally, when quality of each beam failure detection resource in the first beam failure detection resource group is lower than the first threshold, if there is no candidate beam resource whose quality is higher than the second threshold in the first candidate beam resource group, the transceiver module 602 is further configured to send second indication information to the network device.

All related content of the steps in the foregoing method embodiments may be cited in function descriptions of corresponding function modules. Details are not described herein again.

In this embodiment, the terminal device 60 is presented in a form of function modules obtained through division in an integrated manner. The "module" herein may be a specific ASIC, a circuit, a processor executing one or more software or firmware programs, a memory, an integrated logic circuit, and/or another component that can provide the foregoing functions. In a simple embodiment, a person skilled in the art may figure out that the terminal device 60 may be in a form of the terminal device 40 shown in FIG. 3.

For example, the processor 401 in the terminal device 40 shown in FIG. 3 may invoke the computer-executable instructions stored in the memory 402, to enable the terminal device 40 to perform the beam failure recovery method in the foregoing method embodiments.

Specifically, the processor 401 in the terminal device 40 shown in FIG. 3 may invoke the computer-executable instructions stored in the memory 402, to implement functions/implementation processes of the processing module 601 and the transceiver module 602 in FIG. 6. Alternatively, the processor 401 in the terminal device 40 shown in FIG.

3 may invoke the computer-executable instructions stored in the memory 402, to implement functions/implementation processes of the processing module 601 in FIG. 6, and the transceiver 403 in the terminal device 40 shown in FIG. 3 may implement functions/implementation processes of the transceiver module 602 in FIG. 6.

The terminal device 60 provided in this embodiment may perform the beam failure recovery method. Therefore, for technical effects that can be achieved by the terminal device 60, refer to the foregoing method embodiments. Details are not described herein again.

Figure 7:
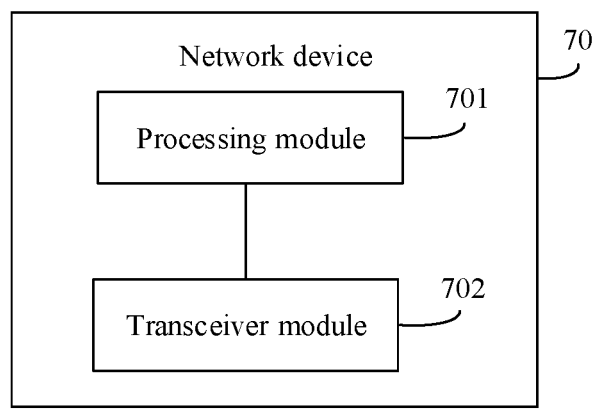
FIG. 7 is a schematic diagram of another structure of a network device according to an embodiment of this application.

Alternatively, for example, the communication apparatus is the network device in the foregoing method embodiments. FIG. 7 is a schematic diagram of a structure of a network device 70. The network device 70 includes a processing module 701 and a transceiver module 702. The transceiver module 702 may also be referred to as a transceiver unit, configured to implement a sending and/or receiving function. For example, the transceiver module 702 may be a transceiver circuit, a transceiver machine, a transceiver, or a communication interface.

The transceiver module 702 may include a receiving module and a sending module, which are respectively configured to perform receiving and sending steps performed by the network device in the foregoing method embodiments. The processing module 701 may be configured to perform steps other than the receiving and sending steps performed by the network device in the foregoing method embodiments.

For example, the processing module 701 is configured to generate configuration information, where the configuration information is used to determine M beam failure detection resource groups and N candidate beam resource groups, M and N are positive integers, and both M and N are not 1; the transceiver module 702 is configured to: send the configuration information to a terminal device; and The transceiver module 702 is further configured to receive first indication information from the terminal device, where the first indication information is used to indicate a first candidate beam resource, the first candidate beam resource is a candidate beam resource in one or more candidate beam resources whose quality is higher than a second threshold and that are in a first candidate beam resource group, the first candidate beam resource group is a candidate beam resource group that is associated with a first beam failure detection resource group and that is in the N candidate beam resource groups, and the first beam failure detection resource group is any one of the M beam failure detection resource groups.

Optionally, that the transceiver module 702 is further configured to receive first indication information from the terminal device includes: The transceiver module 702 is further configured to receive a first PUCCH from the terminal device, where the first PUCCH carries or is associated with the first indication information; the transceiver module 702 is further configured to receive a first MAC-CE from the terminal device, where the first MAC-CE carries or is associated with the first indication information; or the transceiver module 702 is further configured to receive a first PRACH from the terminal device, where the first PRACH carries or is associated with the first indication information.

Optionally, the transceiver module 702 is further configured to receive second indication information from the terminal device.

All related content of the steps in the foregoing method embodiments may be cited in function descriptions of corresponding function modules. Details are not described herein again.

In this embodiment, the network device 70 is presented in a form of function modules obtained through division in an integrated manner. The "module" herein may be a specific ASIC, a circuit, a processor executing one or more software or firmware programs, a memory, an integrated logic circuit, and/or another component that can provide the foregoing functions. In a simple embodiment, a person skilled in the art may figure out that the network device 70 may be in a form of the network device 30 shown in FIG. 3.

For example, the processor 301 in the network device 30 shown in FIG. 3 may invoke the computer-executable instructions stored in the memory 302, to enable the network device 30 to perform the beam failure recovery method in the foregoing method embodiments.

Specifically, the processor 301 in the network device 30 shown in FIG. 3 may invoke the computer-executable instructions stored in the memory 302, to implement functions/implementation processes of the processing module 701 and the transceiver module 702 in FIG. 7. Alternatively, the processor 301 in the network device 30 shown in FIG. 3 may invoke the computer-executable instructions stored in the memory 302, to implement functions/implementation processes of the processing module 701 in FIG. 7, and the transceiver 303 in the network device 30 shown in FIG. 3 may implement functions/implementation processes of the transceiver module 702 in FIG. 7.

The network device 70 provided in this embodiment may perform the beam failure recovery method. Therefore, for technical effects that can be achieved by the network device 70, refer to the foregoing method embodiments. Details are not described herein again.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to instruct the communication apparatus to perform the method in any one of the foregoing method embodiments. Certainly, the memory may not be located in the communication apparatus. In another possible design, the communication apparatus further includes an interface circuit. The interface circuit is a code/data read/write interface circuit, and the interface circuit is configured to: receive computer-executable instructions (where the computer-executable instructions are stored in a memory, may be directly read from the memory, or may pass through another component), and transmit the computer-executable instructions to the processor. When the communication apparatus is a chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions are generated according to the embodiments of this application. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments of this application, the computer may include the foregoing apparatuses.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the term "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the scope of this application. Correspondingly, the specification and the accompanying drawings are merely example descriptions of this application defined by the appended claims, and are considered as any of or all modifications, variations, combinations or equivalents that cover the scope of this application. It is clear that, a person skilled in the art can make various modifications and variations to this application without departing from the spirit and scope of this application. In this way, this application is intended to cover these modifications and variations of this application provided that they fall within the scope of the claims of this application and equivalent technologies thereof

What is claimed is:

1. A beam failure recovery method, wherein the method comprises:
    receiving configuration information;
    determining M beam failure detection resource groups and N candidate beam resource groups based on the configuration information, wherein M and N are positive integers greater than or equal to 2;
    when a beam failure occurs in a first beam failure detection resource group, determining, from a first candidate beam resource group, a first candidate beam resource whose quality is higher than a threshold;
    sending first indication information, wherein the first indication information indicates the first candidate beam resource, the first beam failure detection resource group is comprised in the M beam failure detection resource groups, and the first candidate beam resource group is comprised in the N candidate beam resource groups, and wherein the first beam failure detection resource group and the first candidate beam resource group are associated with a same control resource set (CORESET) group; and
    when no candidate beam resource in the first candidate beam resource group has a quality higher than the threshold, sending second indication information, wherein the second indication information indicates no candidate beam resource has the quality higher than the threshold.

2. The method according to claim 1, wherein:
    the configuration information comprises the M beam failure detection resource groups, and each of the M beam failure detection resource groups comprises one or more beam failure detection resources.

3. The method according to claim 1, wherein the configuration information comprises M CORESET groups, and wherein determining the M beam failure detection resource groups based on the configuration information comprises:
    if no beam failure detection resource is configured, determining the M beam failure detection resource groups based on the M CORESET groups, wherein each of the M CORESET groups is configured to determine one beam failure detection resource group.

4. The method according to claim 3, wherein each of the M CORESET groups is associated with one or more of the N candidate beam resource groups.

5. The method according to claim 1, wherein:
    the first beam failure detection resource group and the first candidate beam resource group are associated with at least one of an index of a CORESET, an index of a TAG, an index of a DMRS port, an index of a DMRS port group, an index for CORESET grouping, an index for generating a HARQ codebook, a scrambling index, an index of a beam failure recovery configuration, an index of a PUCCH resource, an index of a PUCCH resource group, an index of an SRS resource group, a slot index, or a sub-slot index; or
    the first beam failure detection resource group is associated with the first candidate beam resource group.

6. The method according to claim 1, wherein the sending first indication information comprises:
    sending a first physical uplink control channel (PUCCH), wherein the first PUCCH carries or is associated with the first indication information; or
    sending a first medium access control-control element (MAC-CE), wherein the first MAC-CE carries or is associated with the first indication information;
    wherein the first indication information comprises an index of the first beam failure detection resource group.

7. The method according to claim 6, wherein the first PUCCH is associated with the first indication information comprises the first PUCCH is associated with the index of the first beam failure detection resource group.

8. A communication apparatus, wherein the communication apparatus comprises:
    at least one processor;
    a transceiver; and
    one or more memories coupled to the at least one processor and storing programming instructions for execution by the at least one processor to:
        receive, by the transceiver, configuration information;
        determine M beam failure detection resource groups and N candidate beam resource groups based on the configuration information, wherein M and N are positive integers greater than or equal to 2;
        when a beam failure occurs in a first beam failure detection resource group, determine, from a first candidate beam resource group, a first candidate beam resource whose quality is higher than a threshold;

send first indication information, wherein the first indication information indicates the first candidate beam resource, the first beam failure detection resource group is comprised in the M beam failure detection resource groups, and the first candidate beam resource group is comprised in the N candidate beam resource groups, and wherein the first beam failure detection resource group and the first candidate beam resource group are associated with a same control resource set (CORESET) group; and when no candidate beam resource in the first candidate beam resource group has a quality higher than the threshold, send second indication information, wherein the second indication information indicates no candidate beam resource has the quality higher than the threshold.

9. The communication apparatus according to claim 8, wherein:
the configuration information comprises the M beam failure detection resource groups, and each of the M beam failure detection resource groups comprises one or more beam failure detection resources.

10. The communication apparatus according to claim 8, wherein the configuration information comprises M CORESET groups, and wherein determine the M beam failure detection resource groups based on the configuration information comprises:
if no beam failure detection resource is configured for the communication apparatus, determine the M beam failure detection resource groups based on the M CORESET groups, wherein each of the M CORESET groups is configured to determine one beam failure detection resource group.

11. The communication apparatus according to claim 10, wherein each of the M CORESET groups is associated with one or more of the N candidate beam resource groups.

12. The communication apparatus according to claim 8, wherein:
the first beam failure detection resource group and the first candidate beam resource group are associated with at least one of an index of a CORESET, an index of a TAG, an index of a DMRS port, an index of a DMRS port group, an index for CORESET grouping, an index for generating a HARQ codebook, a scrambling index, an index of a beam failure recovery configuration, an index of a PUCCH resource, an index of a PUCCH resource group, an index of an SRS resource group, a slot index, or a sub-slot index; or
the first beam failure detection resource group is associated with the first candidate beam resource group.

13. The communication apparatus according to claim 8, wherein send the first indication information comprises:
send a first physical uplink control channel (PUCCH), wherein the first PUCCH carries or is associated with the first indication information; or
send a first medium access control-control element (MAC-CE), wherein the first MAC-CE carries or is associated with the first indication information;
wherein the first indication information comprises an index of the first beam failure detection resource group.

14. The communication apparatus according to claim 13, wherein the first PUCCH is associated with the first indication information comprises the first PUCCH is associated with the index of the first beam failure detection resource group.

15. A communication system, wherein the communication system comprises a communication apparatus and a network device, wherein:
the network device is configured to send configuration information to the communication apparatus;
the communication apparatus is configured to:
receive the configuration information from the network device;
determine M beam failure detection resource groups and N candidate beam resource groups based on the configuration information, wherein M and N are positive integers greater than or equal to 2;
when a beam failure occurs in a first beam failure detection resource group, determine, from a first candidate beam resource group, a first candidate beam resource whose quality is higher than a threshold;
send first indication information to the network device; and
when no candidate beam resource in the first candidate beam resource group has a quality higher than the threshold, send second indication information, wherein the second indication information indicates no candidate beam resource has the quality higher than the threshold; and
the network device is further configured to receive the first indication information from the communication apparatus, wherein the first indication information indicates the first candidate beam resource, the first beam failure detection resource group is comprised in the M beam failure detection resource groups, and the first candidate beam resource group is comprised in the N candidate beam resource groups, and wherein the first beam failure detection resource group and the first candidate beam resource group are associated with a same control resource set (CORESET) group.

16. The communication system according to claim 15, wherein:
the configuration information comprises the M beam failure detection resource groups, and each of the M beam failure detection resource groups comprises one or more beam failure detection resources.

* * * * *